United States Patent
Wanda et al.

(10) Patent No.: US 7,061,635 B1
(45) Date of Patent: Jun. 13, 2006

(54) INFORMATION PROCESSING APPARATUS, DISTRIBUTED PRINTING METHOD, AND STORAGE MEDIUM

(75) Inventors: Koichiro Wanda, Kawasaki (JP); Kazutaka Matsueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 09/678,017

(22) Filed: Oct. 4, 2000

(30) Foreign Application Priority Data

Oct. 5, 1999 (JP) .................................. 11-284287
Oct. 5, 1999 (JP) .................................. 11-284289

(51) Int. Cl.
*G06F 15/00* (2006.01)
*G06K 1/00* (2006.01)

(52) U.S. Cl. ..................... 358/1.15; 358/1.1; 358/1.13; 358/1.17

(58) Field of Classification Search ............... 358/1.15, 358/1.13, 1.9, 11–14, 1.16, 1.11, 1.1, 1.12, 358/1.14; 399/402
See application file for complete search history.

(56) References Cited

U.S. PATENT DOCUMENTS

| | | | | |
|---|---|---|---|---|
| 6,433,882 B1 * | 8/2002 | Mori et al. | ................. | 358/1.13 |
| 6,665,081 B1 * | 12/2003 | Suzuki et al. | ............... | 358/1.13 |
| 6,816,270 B1 * | 11/2004 | Cooper et al. | ............. | 358/1.13 |
| 2002/0101604 A1 * | 8/2002 | Mima et al. | ................. | 358/1.15 |

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

A requested print job is divided and distributed to a plurality of printers to efficiently and correctly print data of the print job, with only a simple user instruction of distributed printing. Under the control of a distribution controller, data of a print job is divided into data corresponding to the number of printers from which the data is output, and spooled in specific file formats in accordance with a combination of the printers. In accordance with the spooled data, divided print data is generated and distributed to the printers via a network under the control of a transmission controller.

68 Claims, 17 Drawing Sheets

FIG. 9

SETTING OF DISTRIBUTION ALGORITHM

41 —● PAGE
  42 —● EQUAL
  43 —○ DESIGNATE PAGES
      44 { ____ PAGES FOR PRINTER ____
          ____ PAGES FOR PRINTER ____
          ____ PAGES FOR PRINTER ____

45 —○ HIGH-SPEED
46 —● RESULTS OF DISTRIBUTED PRINTING
  47 —● REPORT TO PRINTER ____
  48 —○ REPORT UPON ERROR TO PRINTER ____
  49 —○ NOT REPORT

REPORT ON DISTRIBUTED PRINTING RESULTS

|  | JOB | TIME | PAGE | PRINTER | RESULTS |
|---|---|---|---|---|---|
| 1601 | NC001.doc | 30SEC | 10 | PRINTER A | 3 PAGES |
| 1602 | NC001.doc |  | 10 | PRINTER B | NO PAPER |
| 1603 | NC001.doc |  | 10 | PRINTER C | 7 PAGES |

FIG. 20

| |
|---|
| STEP OF EXECUTING DISTRIBUTED PRINTING |
| STEP OF OUTPUTTING REPORT ON DISTRIBUTED PRINTING RESULTS |
| STEP OF OUTPUTTING REPORT UPON ERROR |
| SETTING PRINTER TO WHICH REPORT IS OUTPUT |
| STEP OF SUSPENDING NEXT JOB DURING REPORT OUTPUT PROCESS |
| STEP OF SETTING PRINTERS IN OFFLINE MODE AFTER DISTRIBUTED PRINTING |
| STEP OF SETTING PRINTER IN OFFLINE MODE AFTER REPORT OUTPUT PROCESS |
| STEP OF CAUSING PRINTERS TO PRODUCE AUDIO ALARM AFTER DISTRIBUTED PRINTING |
| STEP OF CAUSING PRINTER TO PRODUCE AUDIO ALARM AFTER REPORT OUTPUT PROCESS |

FIG. 21

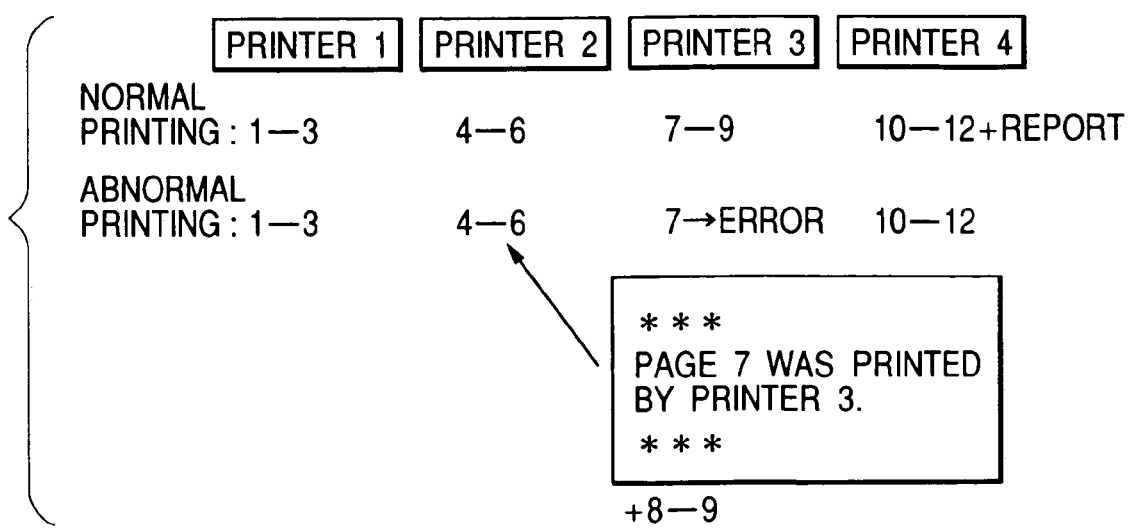

FIG. 24

MEMORY MAP OF MEM MEDIUM

| DIRECTORY |
|---|
| 1ST DATA PROCESSING PROGRAM<br>PROGRAM CODES FOR FLOWCHART OF FIG.10 |
| 2ND DATA PROCESSING PROGRAM<br>PROGRAM CODES FOR FLOWCHART OF FIG.12 |
| 3RD DATA PROCESSING PROGRAM<br>PROGRAM CODES FOR FLOWCHART OF FIG.14 |
| 4TH DATA PROCESSING PROGRAM<br>PROGRAM CODES FOR FLOWCHART OF FIG.15 |
| 5TH DATA PROCESSING PROGRAM<br>PROGRAM CODES FOR FLOWCHART OF FIG.17 |
| 6TH DATA PROCESSING PROGRAM<br>PROGRAM CODES FOR FLOWCHART OF FIGS.18A & 18B |
| 7TH DATA PROCESSING PROGRAM<br>PROGRAM CODES FOR FLOWCHART OF FIGS.19A & 19B |
| 8TH DATA PROCESSING PROGRAM<br>PROGRAM CODES FOR FLOWCHART OF FIG.22 |

INFORMATION PROCESSING APPARATUS, DISTRIBUTED PRINTING METHOD, AND STORAGE MEDIUM

BACKGROUND OF THE INVENTION

1. Field of the Invention

The present invention relates to an information processing apparatus and a distributed printing method for dividing a print job and printing print data at a plurality of printers, and a storage medium storing a program realizing such a method.

2. Related Background Art

A print process by application software is executed by a print function provided by a general OS installed in an information processing apparatus. However, this print process by application software to be executed by a print function provided by a general OS installed in an information processing apparatus, is associated with the following problems if used by a plurality of printers.

For example, a plurality of printer objects are formed in a printer manager of an OS, e.g., Windows (product name) of Microsoft Corporation. If a plurality of printers are used to perform print processes through application software, a user is required to enter a print command for each of the printers.

Application software cannot spool print data as the data for a plurality of printers.

If printers are of the same type (having the same PDL and the same printable area), a plurality of job control portions of a PDL generated by the common printer driver are formed to perform distributed printing by supplying PDL to distributed pages. This approach cannot be applied to the distributed printing by using printers of different types. If the same spool and print process are to be used for the distributed printing by a plurality of printers of different types, only the function shared by all printers can be used, and a function characteristic to each printer cannot be used.

For the distributed printing by a plurality of printers, a user cannot be notified of information what pages are printed on which printer.

During the distributed printing, upon copies of a distributed printing job at one printer, copies of another job may be placed. Even if a distributed printing printer becomes abnormal such as no-paper and another printer is automatically used to continue the printing, this changed output destination is not notified to a user. It becomes difficult for the user to collect output copies.

A method of notifying a completion of the distributed printing is not known. If an output of the next job is executed, copies of the current job and next job are mixed. A user is required to sort the copies with a large work load after the completion of the print jobs. These problems associated with the conventional techniques have long been desired to be solved.

SUMMARY OF THE INVENTION

The present invention has been made in order to solve the above problems. It is a first object of the present invention to provide a control method for a distributed printing process using a plurality of printers, which method allows a user only to enter a simple instruction and an application to output print data only once.

In order to achieve the above object, the invention provides an information processing apparatus in which data is spooled in specific file formats in accordance with a combination of a plurality of printers for outputting the divided print jobs, and divided print data is generated from the spooled data and output to the printers in order to print the divided print jobs at the printers. Accordingly, with a simple distributed printing instruction, data of a specific file format can be generated which is suitable even if the types of a combination of printers used for the distributed printing and printer drivers are all the same or different. Then, the requested print job is divided so that each printer can efficiently and normally output the print job through distributed printing.

It is a second object of the invention to provide a control method of reliably outputting a distributed printing result report indicating the result of the distributed printing by a plurality of printers.

In order to achieve the above object, the invention provides an information processing apparatus in which while the print job is output at each of a plurality of registered distributed printing printers, the output state of the print job at each printer is monitored to form a distributed printing result report and output to a designated printer. Accordingly, the distributed printing result of the distributed printing can be notified correctly to a user. A print process environment allowing a user to collect copies of the distributed printing from the printers can be configured as desired.

It is a third object of the invention to optimize the distributed printing by using spooling means for spooling data in suitable data formats in accordance with a combination of a plurality of printers for outputting the divided print jobs.

In order to achieve the above object, the invention provides an information processing apparatus comprising spooling means (corresponding to an EMF spooler 1301 shown in FIG. 7) for spooling data in specific file formats in accordance with a combination of a plurality of printers for outputting the divided print jobs; and output control means (corresponding to a distribution controller 1304 shown in FIG. 7) for generating divided print data from the data spooled by the spooling means, and outputting the divided print data to the printers in order to print the divided print jobs at the printers.

Other features and advantages of the present invention will become apparent from the following detailed description taken in conjunction with the accompanying drawings, in which like reference characters designate the same or similar parts throughout the figures thereof.

BRIEF DESCRIPTION OF THE DRAWINGS

FIG. 9 shows an example of a user interface display for setting a distributed printing algorithm for the DP printer shown in FIG. 6.

FIG. 20 is a memory map showing the contents of each step of a distributed printing program loaded in RAM shown in FIG. 2.

FIG. 21 is a diagram showing an output state when a distribution error occurs at a DP printer of the invention.

FIG. 24 is a memory map of a storage medium storing the contents of various programs readable by a print system applicable to the information processing apparatus of the invention.

DETAILED DESCRIPTION OF THE PREFERRED EMBODIMENTS

Figure 1:
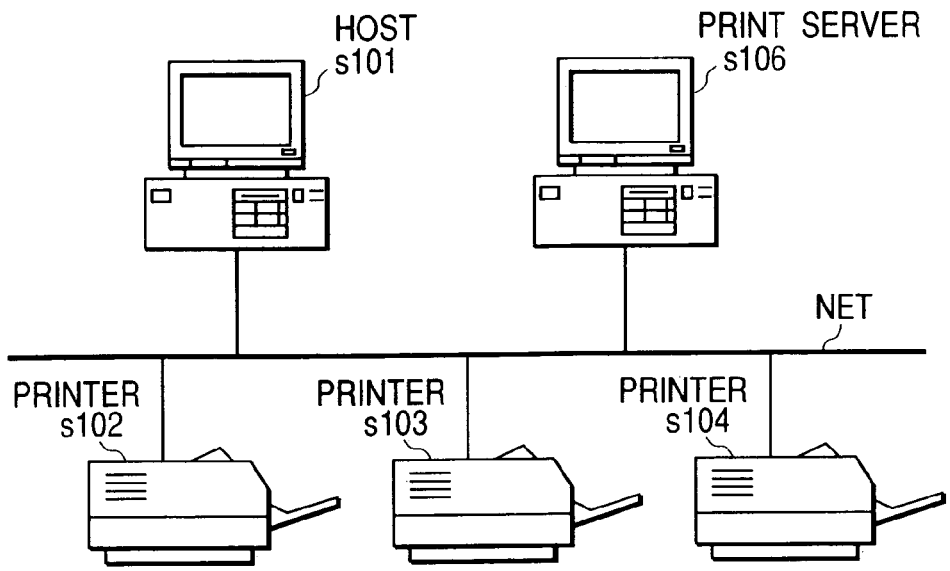
FIG. 1 is a diagram showing the structure of a print system applicable to an information processing apparatus of the invention.

FIG. 1 is a diagram showing the structure of a print system applicable to an information processing apparatus of the invention. In FIG. 1, s101 represents a host computer. Printers s102 to s104 capable of a distributed printing process are connected to a network NET to execute communications using a predetermined protocol. s106 represents a printer server which manages the print order of the printers in accordance with print requests from a plurality of clients (host computers) connected to the network NET.

First Embodiment

Figure 2:
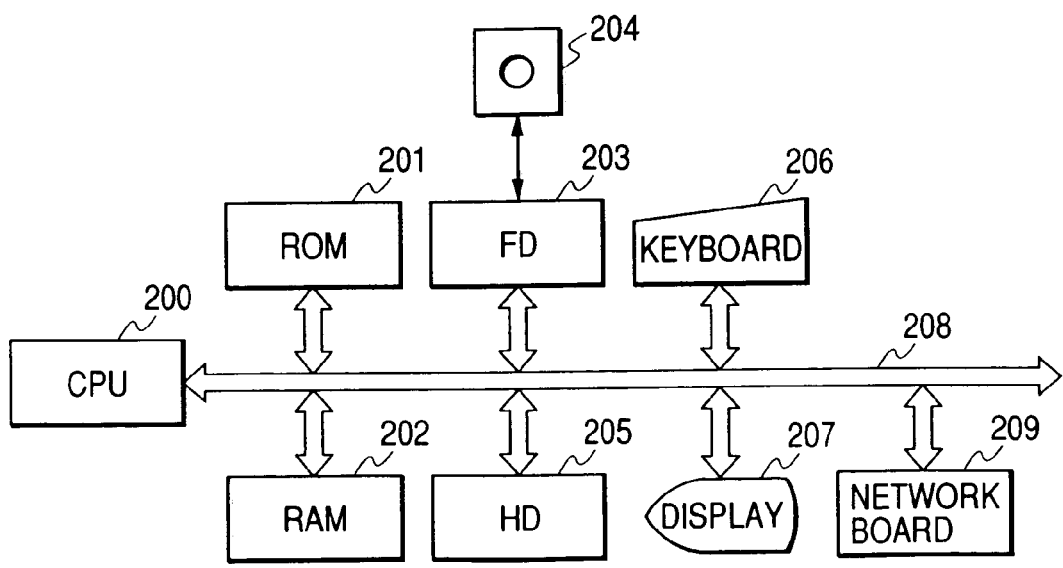
FIG. 2 is a block diagram showing the structure of an information processing apparatus according to a first embodiment of the invention.

FIG. 2 is a block diagram showing the structure of an information processing apparatus according to a first embodiment of the invention. In FIG. 2, reference numeral 200 represents a CPU which controls access to various devices connected to a bus 208 in accordance with an application program, an OS or the like stored in a ROM 201, a hard disk 205 or the like.

CPU 200 executes each process of a client by using a RAM 202 as a working memory, in accordance with a program stored in ROM 201 or RAM 202. Reference numeral 203 represents a floppy disk (FD) drive in which a floppy disk 204 is inserted as shown in FIG. 3 so that data is transferred between the client machine and floppy disk 204.

Reference numeral 206 represents a keyboard, and reference numeral 207 represents a display. Reference numeral 209 represents a network board which provides a communication function to the printers s102 to s104 shown in FIG. 1, unrepresented servers and client machines, by using a plurality of protocols. These components 200, 201, 202, 203, 205, 206, 207 and 209 are connected by a system bus 208 so that data can be transferred between these components.

Figure 3:
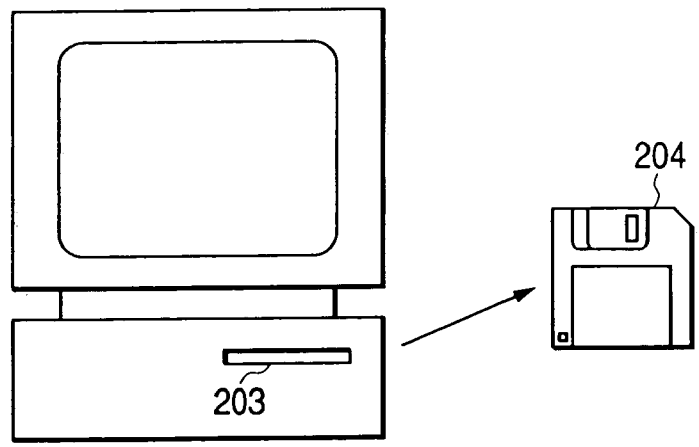
FIG. 3 is a diagram showing an FD drive shown in FIG. 2 into which a floppy disk is inserted.

FIG. 3 shows the FD drive 205 shown in FIG. 2 into which a floppy disk 204 is inserted.

Figure 4:
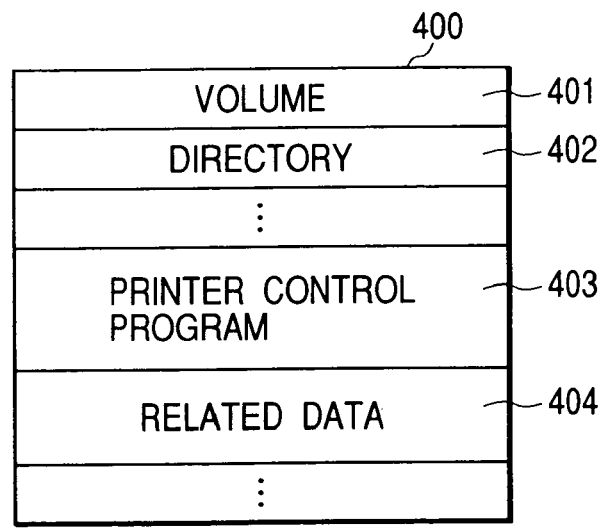
FIG. 4 is a memory map showing the data stored in the floppy disk shown in FIG. 3.

FIG. 4 is a memory map of data in the floppy disk 204 shown in FIG. 2. As shown in FIG. 4, the floppy disk 204 stores therein volume data 401, directory data 402, a control program 403 for the printers s102 to s104, and related data 404.

Figure 5:
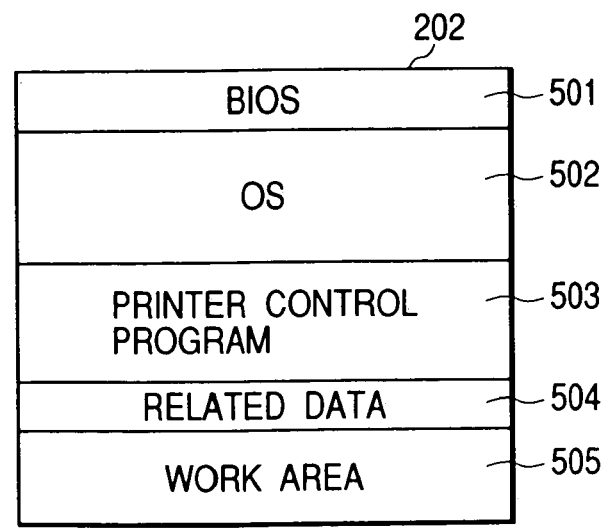
FIG. 5 is a memory map showing the contents of RAM shown in FIG. 2.

FIG. 5 shows an example of a memory map of RAM 202 shown in FIG. 2, the memory map showing the control program 403 developed from the floppy disk 204. As shown in FIG. 5, RAM 202 has areas for storing a basic I/O program 501 loaded from ROM 201, an operating system (OS) 502 loaded from the hard disk 205 and a network printer control program 503 developed from the floppy disk 204, and a working area 505.

Figure 6:
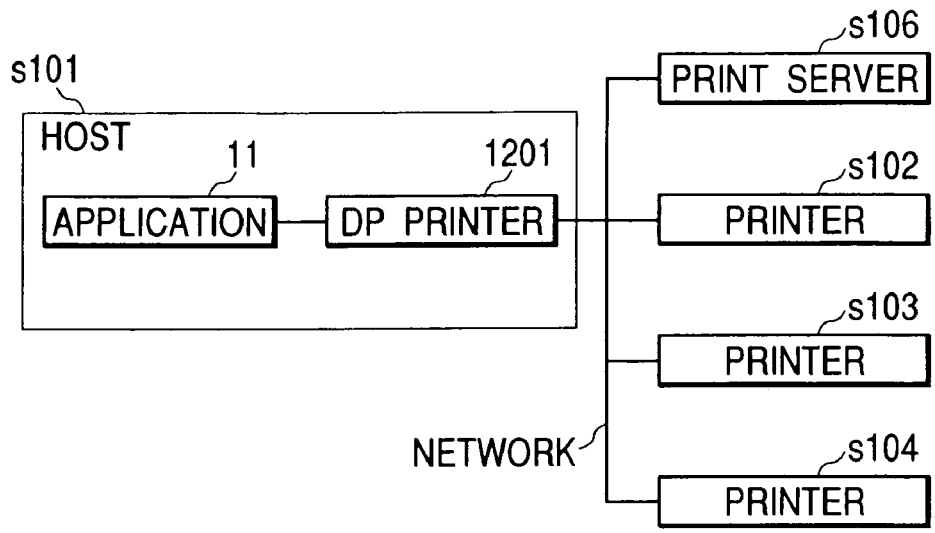
FIG. 6 is a block diagram showing the structure of print system applicable to the information processing apparatus of the invention.

FIG. 6 is a block diagram showing the structure of a print system applicable to the information processing apparatus of the invention. In FIG. 6 s101 represents the host computer shown in FIG. 1. Reference numeral 11 represents an application program which forms text data to be printed. Reference numeral 1201 represents a virtual distributed-processing printer (hereinafter called a "DP printer") for receiving a print request from the application program. As will be later described, the DP printer 1201 is a module set beforehand in the host computer s101 and distributing print data of a page unit to a plurality of printer drivers.

A distributed printing process of this embodiment is executed by designating the DP printer 1201 as an output destination port when text data formed by the application program 11 is to be printed. The DP printer 1201 converts the data supplied from the application program 11 via OS into print data of the printer language capable of being interpreted by each printer, by using a corresponding printer driver, and transmits print data to the corresponding ones of the printers s102 to s104 in response to a print permission from the server s106.

It is not necessarily required to provide both the application program 11 and PD printer 1201 in the same apparatus. For example, the DP printer 1201 may be provided in the print server 106, whereas the application program 11 may be provided in the host computer s101 or client. In this case, a file in the intermediate file format such as a meta file is supplied from the application program 11. Using the metal file will be later described.

Figure 7:
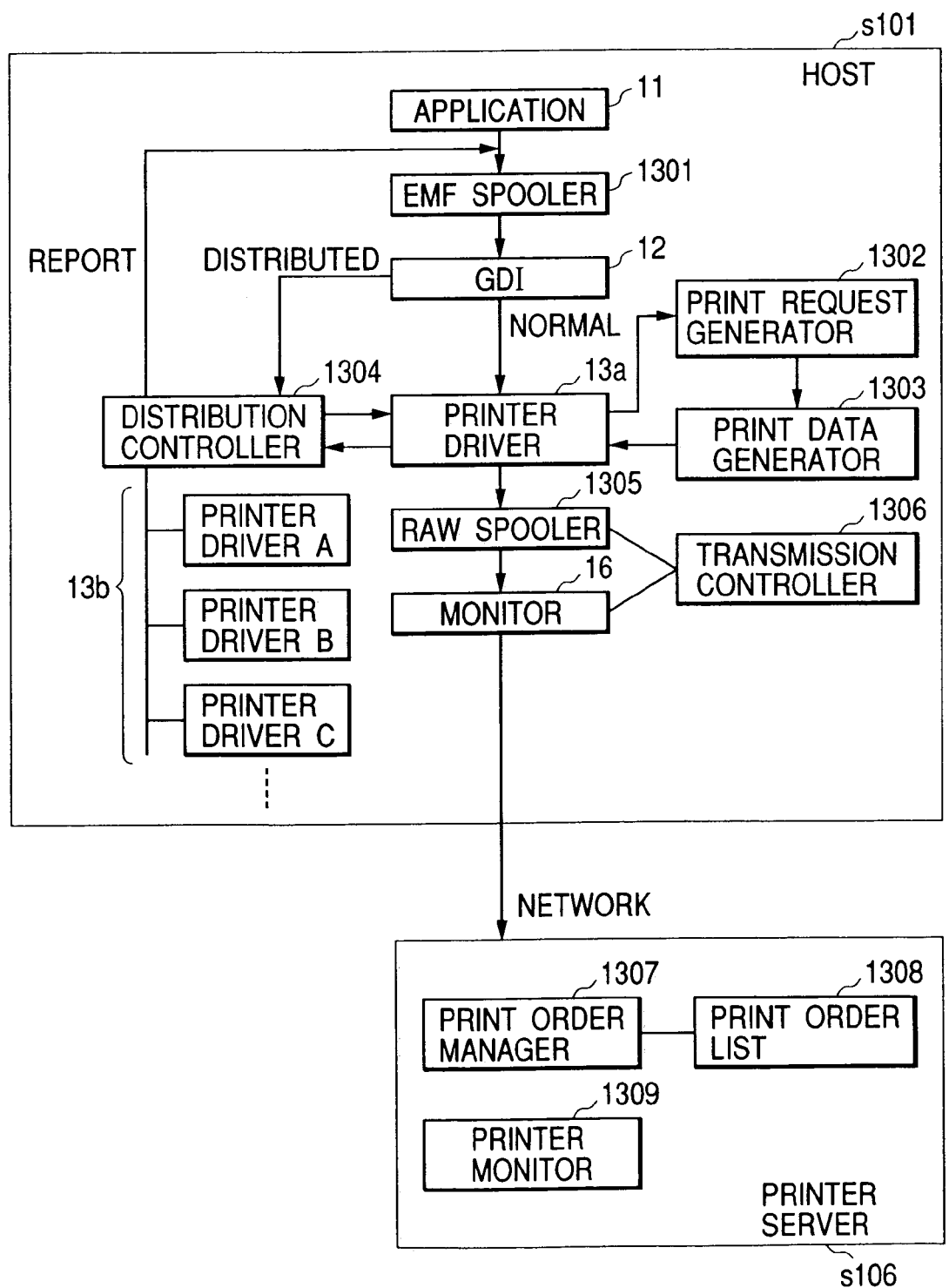
FIG. 7 is a diagram showing the structure of software modules of a print control system of the invention.

FIG. 7 shows the structure of software modules in each apparatus of a print control system of this invention. In FIG. 7, identical apparatus to those shown in FIG. 6 are represented by using identical reference symbols. In FIG. 7, reference numeral 11 represents an application module (application program) for forming text data to be printed, as described already. When the text data formed is to be printed, the application 11 outputs the text data as drawing data to a graphic device interface (GDI) 12 which is drawing means of OS. Reference numeral 1301 represents an EMF spooler supplied by Windows (OS) (registered trademark) of Microsoft Corporation. The EMF spooler 1301 spools the drawing contents as data of the binary format, in accordance with a GDI function issued by the application 11. Reference symbol 13a represents a printer driver built in OS. GDI 12 generates a DDI function capable of being interpreted by the printer driver 13a from the EMF spooled data of the binary format to hence issue a print command to the printer driver 13a.

Reference numeral 1305 represents a RWA spooler of Windows for spooling text data dependent on devices, reference numeral 16 represents a network printer control monitor, and reference numeral 12 represents GDI of Windows.

Reference numeral 1302 represents a print request generator in the printer driver for generating print request information including the name of a print job, an owner name, the name of an output destination printer for printing a print job, a print request time and the like. Reference numeral 1303 represents a print data generator in the printer driver for generating print data of a printer language format capable of being interpreted by an output destination printer. Reference numeral 1306 represents a transmission controller for supplying print request information to the server s106 to receive a print permission for making a printer print the print data generated by the printer driver. Reference numeral 1304 represents a distribution controller for controlling distributed printing, the distribution controller can activate a plurality of printer drivers A to C (collectively indicated at 13b in FIG. 7).

Reference numeral 1307 represents a print order manager module in the server s106 for managing the print order in accordance with the print request information received from the host computer s101 via the network NET. The print request information is managed for each output destination printer and stored in a print order list 1308. Reference numeral 1309 represents a printer monitor connected to the network NET for monitoring the status of each printer under management of the server to notify the print order manager 1307 of a print request, if any, for a printer in a ready state. The printer monitor 1309 executes a polling operation for printers at a predetermined time interval to acquire MIB information and confirm the printer status and print completion page.

In the print control system constructed as above, for printing by the application 11, text data is converted into drawing commands of the intermediate data format executable by a driver, the drawing commands representing drawing data called the GDI function. The drawing data is spooled in the EMF spooler 1301 in the binary data format. The device independent intermediate data spooled in the EMF spooler 1301 is divided into data in the page unit so that this data format is easy to be processed by the distributed printing process.

In the normal printing, the printer driver 13a designated as an output destination port receives intermediate data, i.e., DDI function, and the print request generator 1302 and print data generator 1303 generate the print request information and the print data of the printer language (page descriptive language) capable of being interpreted by a network printer at the print output destination. The generated device dependent print data is spooled in the RAW spooler 1305, and the transmission controller 1306 controls transmission of the print data. The print request information is transmitted by the transmission controller 1306 to the server s106 via the monitor 16 and network NET.

If the DP printer 1201 is designated as the output destination port, it means the distributed printing. In this case, the distribution controller 1304 receives the data of the intermediate format from the EMF spooler 1301 via GDI 12 which is the drawing means of OS, and passes data (DDI function) of the intermediate data format to each printer driver in accordance with distribution setting preset by a user. Similar to the normal printing, the printer driver received the data of the intermediate data format generates the print request information and print data which is spooled in the RAW spooler 1305. In accordance with the distribution setting, the distribution controller 1304 identifies a plurality of DP printer drivers (A to C) and notifies GDI 12 of these drivers to make GDI 12 generate print commands (DDI function) capable of being interpreted by each printer driver and pass the print command to each printer driver. Such a control operation is automatically repeated as many as the number of DP printer drivers. The original drawing command issued by the application 11 is spooled in the EMF spool 1301 as the intermediate data of the binary format. Therefore, by using this spool file, a distributed print instruction can be issued to a plurality of printer drivers, and in addition, it is sufficient for the application to issue the drawing command only once. A print release can be performed earlier and the system becomes easy to be used.

During the distributed printing, the printer monitor 1309 of the server s106 checks whether all printers used for the distributed printing enter a print ready state. If this state is satisfied, the print order manager 1307 issues a print permission to the transmission controller 1306 of the host computer s101. In the distributed printing, data is not printed starting from the printer in the ready state, but data is printed at a time when all the printers take the ready state.

The intermediate data and print data spooled in the EMF and RAW spoolers 1301 and 1305 are stored until the print is completed, in order to use the data for an error process to be later described. Setting for the DP printer 1201 will be described with reference to FIGS. 8 and 9.

Figure 8:
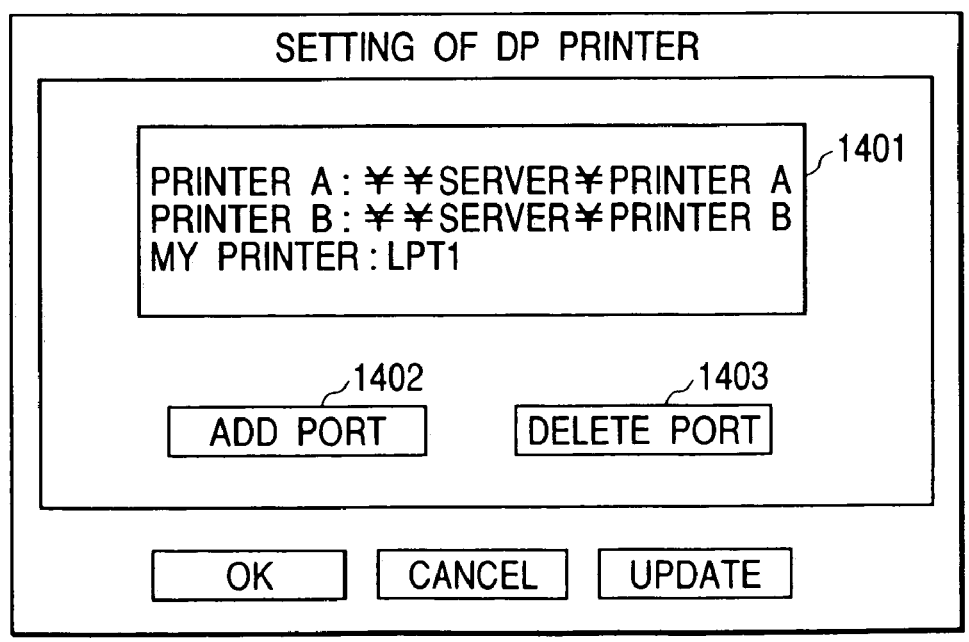
FIG. 8 shows an example of a user interface display for setting a DP printer shown in FIG. 6.

FIG. 8 shows an example of a user interface display for setting the DP printer 1201 shown in FIG. 6. The user interface display is displayed on an unrepresented screen of the host computer. In FIG. 8, reference numeral 1401 represents a window for displaying the names of DP printers and their paths. As shown in this window 1401, it is possible to register DP printers including not only printers (printers A and B) under management of the server s106 of the network but also a local printer (MY printer) connected to its own host computer.

Reference numeral 1402 represents a port addition button. By depressing this button with a pointing device such as a mouse, a new DP printer can be added. Reference numeral 1403 represents a port delete button which is used to delete a printer registered in the window 1401. The DP printer 12 is set through addition and deletion described above. In accordance with a distribution algorithm shown in FIG. 9, the distribution controller 1304 controls to transmit the data of the intermediate data format to each printer set in the DP printer 1201.

FIG. 9 shows an example of a user interface display for setting a distribution algorithm for the DP printer 1201 shown in FIG. 6. In FIG. 9, reference numeral 41 represents a page setting area including an equal setting area 42 and a page designating area 43. When text data having a plurality of pages is to be printed, either the same number of pages is set to printers or the desired numbers of pages are set to printers. By using the page designating area 43, the desired number of pages can be set to each printer in a page area 44.

Reference numeral 45 represents a high speed distributed printing area. When this area 45 is selected, the setting in the page setting area 41 is made invalid. Namely, either the page setting area 41 or the high speed distributed printing area 45 can be made valid. If the high speed distributed printing area 45 is selected, the distribution controller 134 assigns the number of pages to each printer in accordance with PPM (pages per minute) of each DP printer registered in the display of FIG. 8. For example, if the printers A and B and MY printer are registered as the DP printers as shown in FIG. 8 and the printer A is 8 PPM for A4 size, the printer B is 16 PPM and the MY printer is 4 PPM, then the numbers of pages are distributed at a ratio of 2:4:1 for the printers A:B:MY.

Figure 10:
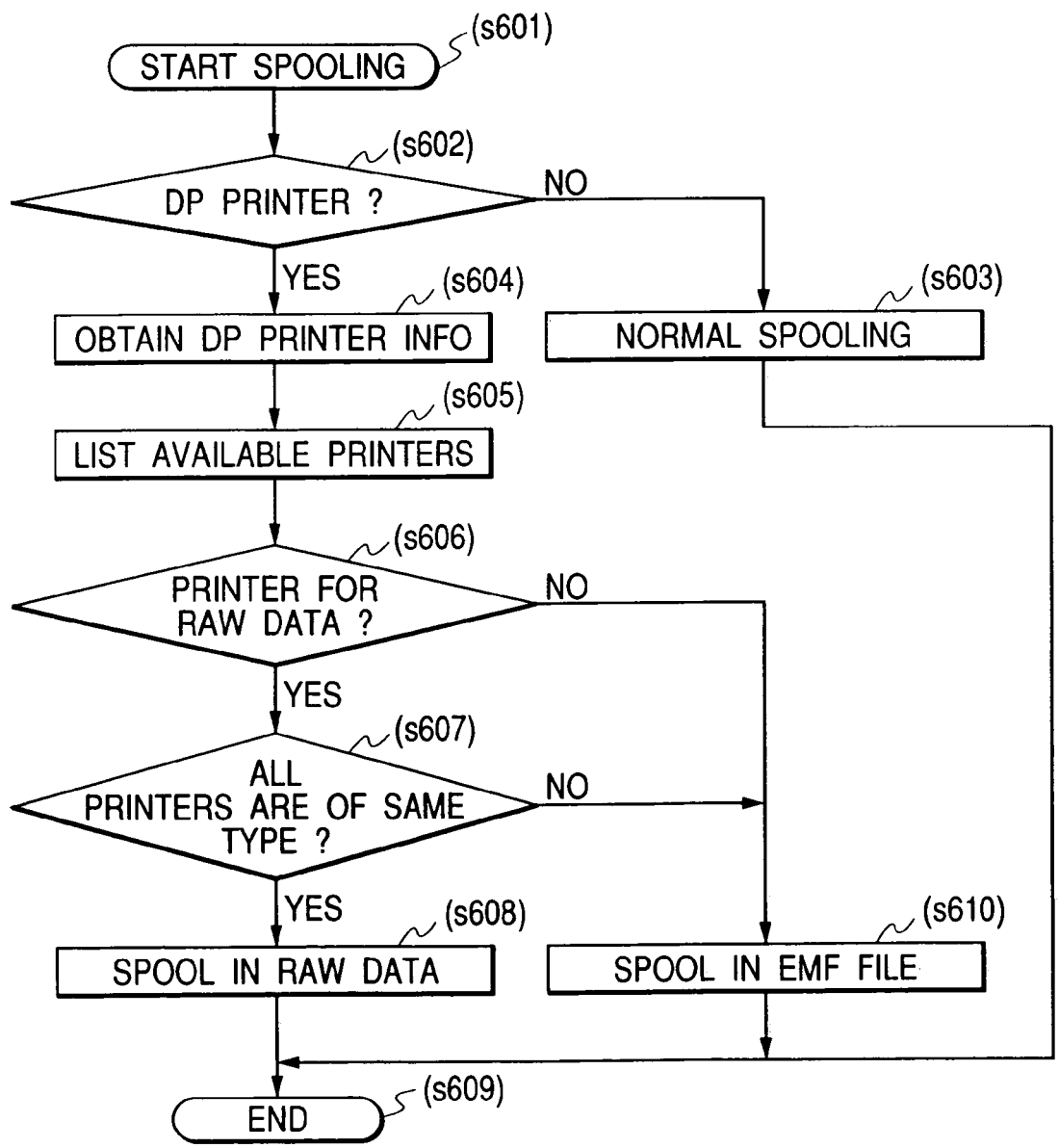
FIG. 10 is a flow chart illustrating an example of a first data process to be executed by the information processing apparatus of the invention.

FIG. 10 is a flow chart illustrating an example of a first data process to be executed by the information processing apparatus of the invention. The first data process corresponds to a spool process for distributed printing by the host computer. The process includes Steps S601 to S609. The distributed printing to be executed at a plurality of printers upon occurrence of one job print command from an application does not depend upon OS and hardware specifications. In this embodiment, however, the description is given assuming a general personal computer (PC) running on a general OS such as Windows NT. In this embodiment, similar to the normal printing, a print process of this invention starts when application software designates a single printer object for distributed printing.

Data and a use method for this distributed printing printer object are generally equal to a printer object for a single printer. The distributed printing printer object has in addition distributed printing printer information such as information on the type of printers at distributed printing destinations and the status of each printer to be set as shown in FIGS. 8 and 9. The distributed printing printer information may be added to an area such as a comment area which a user can freely use or may be managed by software realizing the print method of this invention, if the printer object is provided by a general OS such as Windows.

First, at Step S601 at the start of the print process for printing text data generated by application software at DP printers used as output destination ports, the printer driver is instructed to form a spool file via GDI in the host computer s101. At this time, the distribution controller checks at Step S602 from a presence/absence of DP printer information corresponding to the printer object name, whether the print process is executed either for the distributed printing printer object or for the general printer object. If not for DP printers, the flow advances to Step S603 whereat a normal spool process is executed to thereafter terminate the spool process.

If it is judged at Step S602 that the spool process is for DP printers, than at Step S604 the DP printer information is acquired and at Step S605 available printers are listed. These available printers may be those registered in the DP printer information set as shown in FIGS. 8 and 9, printers having a normal status, printers selected from other conditions such as performance, or the like, so long as they can be listed based upon the DP printer information.

Next, at Step S606 it is checked whether each of the printers listed at Step S605 can execute distributed printing of data of PDL capable of dividing a job in the page unit, i.e., RAW data. For example, such PDL is a LISP (registered trademark of CANON INC.) which is a printer language capable of printing a designated page of one job by embedding page designation information in print job data. If it is judged that the printer can print RAW data itself by designating print data, then at Step S607 it is checked whether all the listed printers are of the same type. If of the same type, e.g., LIPS printer spool file, then at Step S608 a spool file is formed by using best image quality RAW data such as LIPS data to thereafter terminate the spool process at Step S609. The judgement of the same type may be a judgement of the same printer driver. The same type poses no practical problem. The same printer driver does not pose serious problems in generating print data, although there is some difference between print margins and options such as both-side printing and staple.

If it is judged at Step S606 that the printer cannot execute distributed printing of RAW data itself, or if it is judged at Step S607 that the listed DP printers are different types, then at Step 610 a device independent spool file such as an EMF file is generated. In the above manner, the spool file is generated.

The distributed printing of RAW data spooled at Step S608 will be described with reference to FIGS. 11 and 12.

Figure 11:
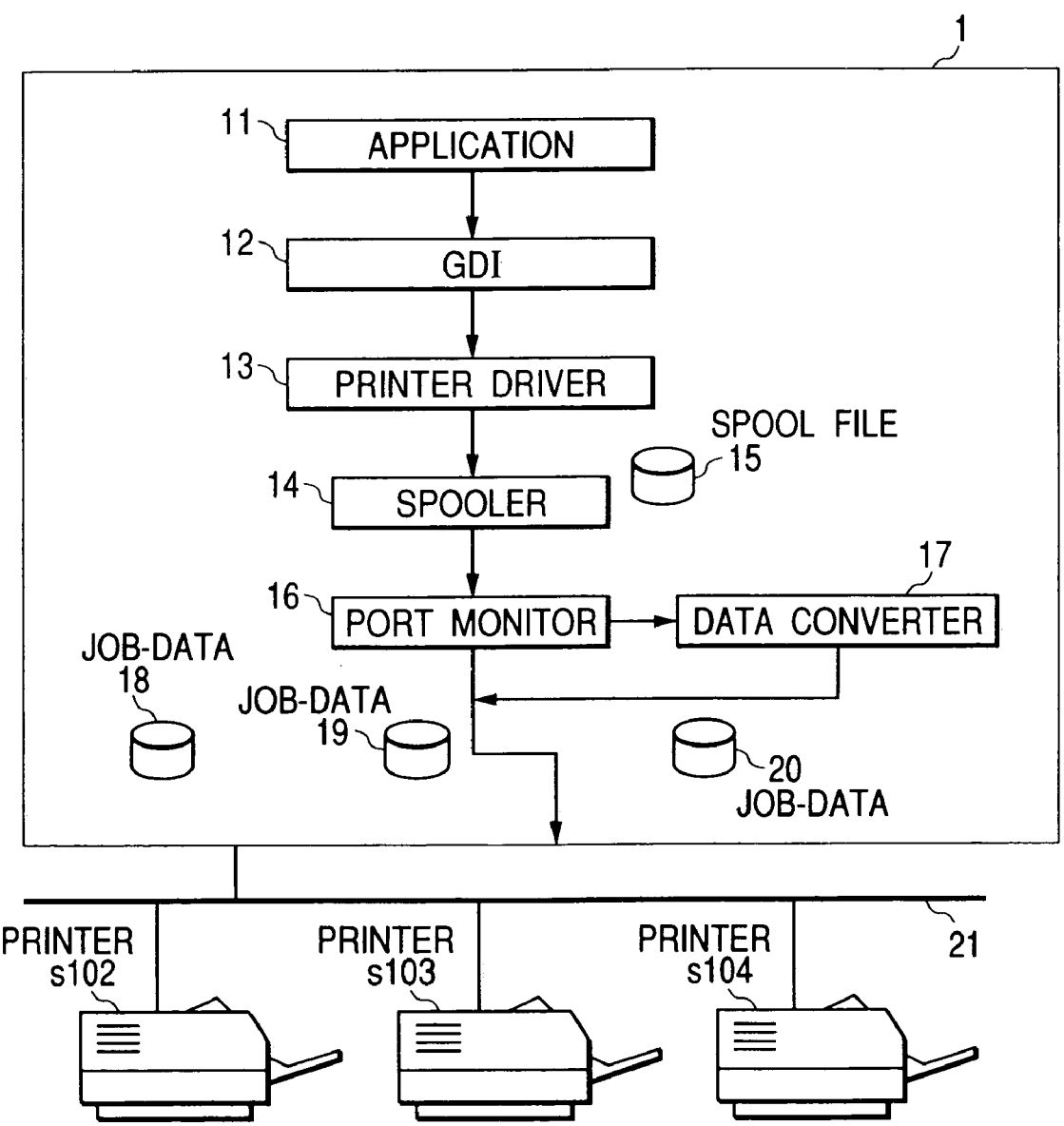
FIG. 11 is a block diagram showing data processing modules of a print system applicable to the information processing apparatus of the invention.

FIG. 11 is a block diagram showing data processing modules of the print system applicable to the information processing apparatus of the invention. Printers s102 to s104 shown in FIG. 11 are of the same type. In FIG. 11, reference numeral 1 represents an information processing apparatus which can communicate with the printers s102 to s104 via a network 21.

In the information processing apparatus, reference numeral 11 represents application software which is read from the hard disk 205 or the like shown in FIG. 2 and loaded in RAM 202 to execute various data processing. Reference numeral 12 represents a graphic sub-system such as GDI of Windows for image processing of a display and a printer. GDI 12 dynamically links modules called device drivers to absorb dependency of each device such as a display and a printer and outputs data to the devices. The module for the printer is called a printer driver 13.

The printer driver 13 is required to prepare a function group called DDI determined to be mounted on a device driver in accordance with its performance and function. GDI 12 converts an API (application programming interface) call of the application into data suitable for the device driver. GDI 12 calls the DDI function group to execute a predetermined print process. GDI 12 sequentially converts the GDI function as the print request from the application 11 into the DDI function.

Reference numeral 14 represents a spooler which receives a drawing function from GDI 12 and stores it as a spool file of RAW data. Reference numeral 16 represents a port monitor for transferring a job. A data converter 17 converts job data into job data 18 to 20 in the page unit, the converted data is transferred to each of the corresponding printers s102 to s104. The data converter 17 is a module in the printer driver 13 which generates PDL print data from the DDI function.

If RAW data is spooled in the spooler 14, this data has a PDL format or image data format capable of being transferred to the printer. Therefore, as shown in FIG. 11, when the port monitor 16 transfers a job, the data converter 17 converts job data into job data in the page unit for distributed printing. The distributed print process will be described with reference to the flow chart shown in FIG. 12.

Figure 12:
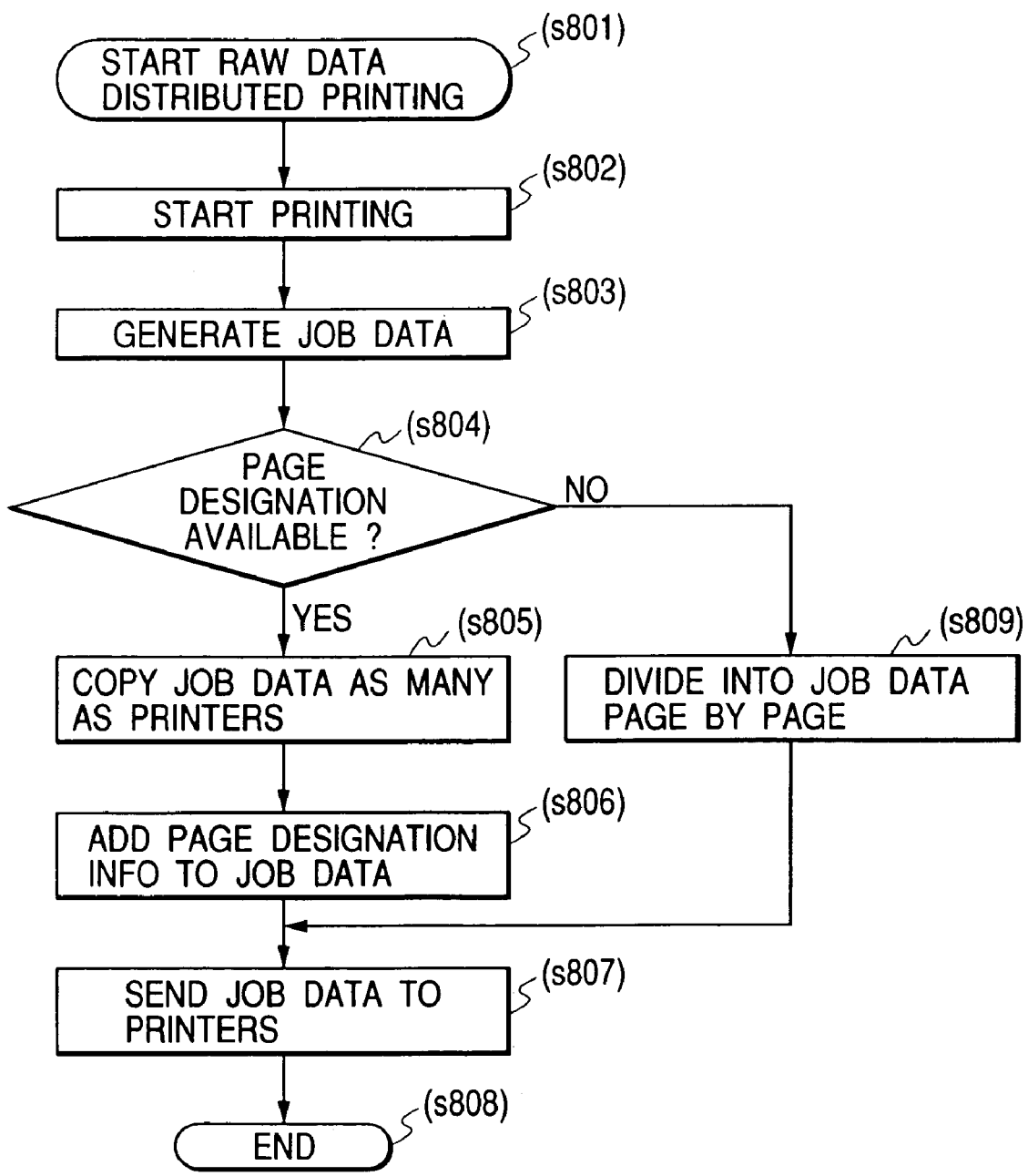
FIG. 12 is a flow chart illustrating an example of a second data process to be executed by the information processing apparatus of the invention.

FIG. 12 is a flow chart illustrating a second data process to be executed by the information processing apparatus of the invention. The second data process corresponds to the spool process for distributed printing to be executed by the host computer. The process includes Steps S801 to S808.

After the spool process described above, the distributed printing process starts at Step S801. At Step S802 when an event of each print occurs at the spooler 14, the port monitor 16 starts the print process. At Step S803 data sequentially written in the port monitor 16 is collected to form job data 18 to 20.

Next, at Step S804 the port monitor 16 shown in FIG. 11 checks whether the file is a PDL file such as LIPS capable of page print designation. If it is judged that page print designation is possible, job data corresponding in amount to the number of DP printers is copied at Step S805.

Next, at Step S806 each job data is assigned page designation information so as not to print the same page at another printer and so as to print all pages of one job at a plurality of printers. Next, at Step S807 job data added with unique page designation information of each page is transferred to the DP printers from the same port to thereafter terminate the distributed printing at Step S808.

If it is judged at Step S804 that the printer cannot execute raster data printing or page designation printing, the job is divided into data in the page unit at Step S809, and at Step S807 job data is transferred to each printer. In the above manner, the distributed printing is realized.

With the operations described above, RAW data can be automatically generated and printed out at DP printers of the same type.

Second Embodiment

Figure 13:
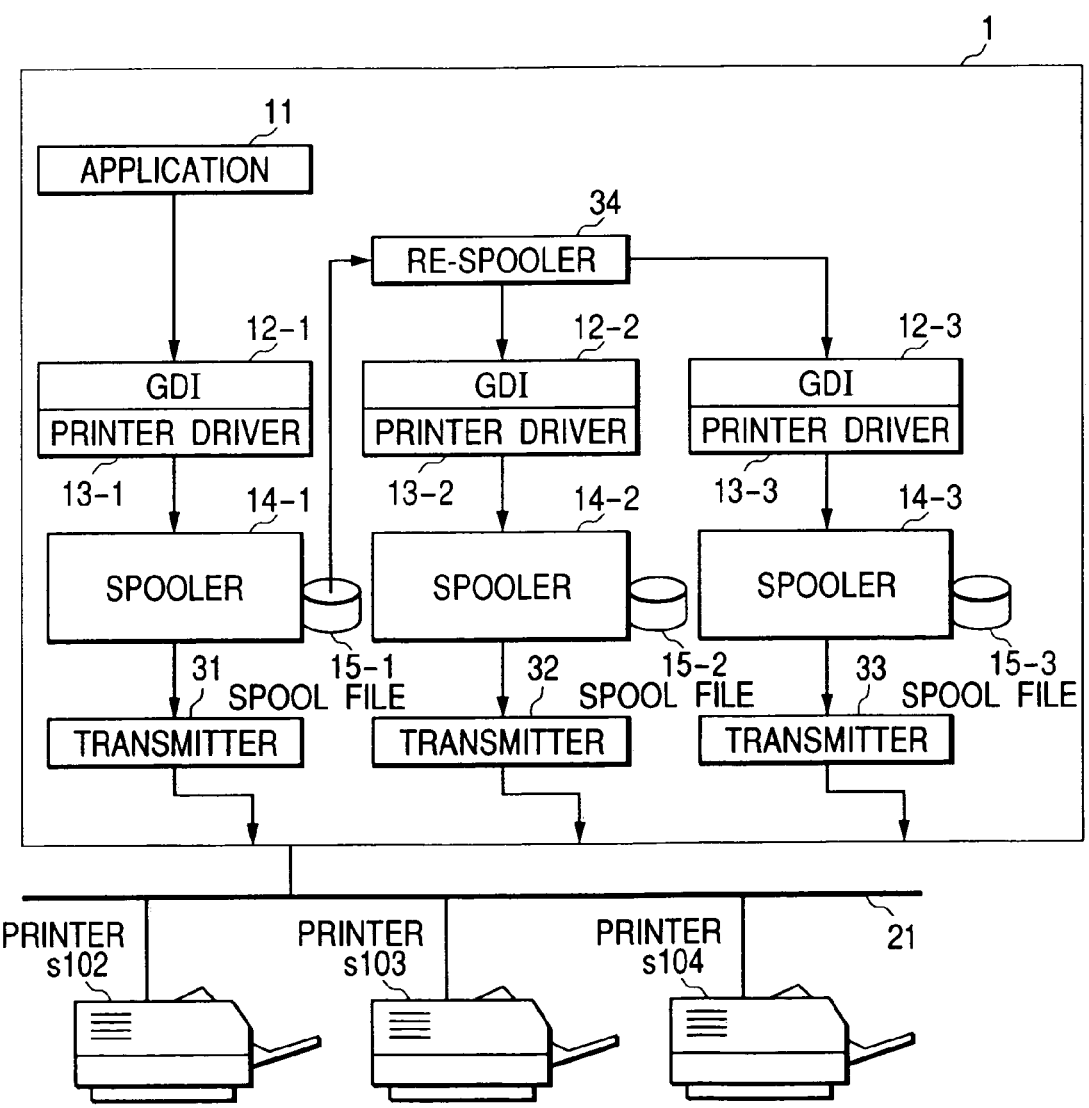
FIG. 13 is a block diagram showing data processing modules of a print system applicable to the information processing apparatus according to a second embodiment of the invention.
Figure 14:
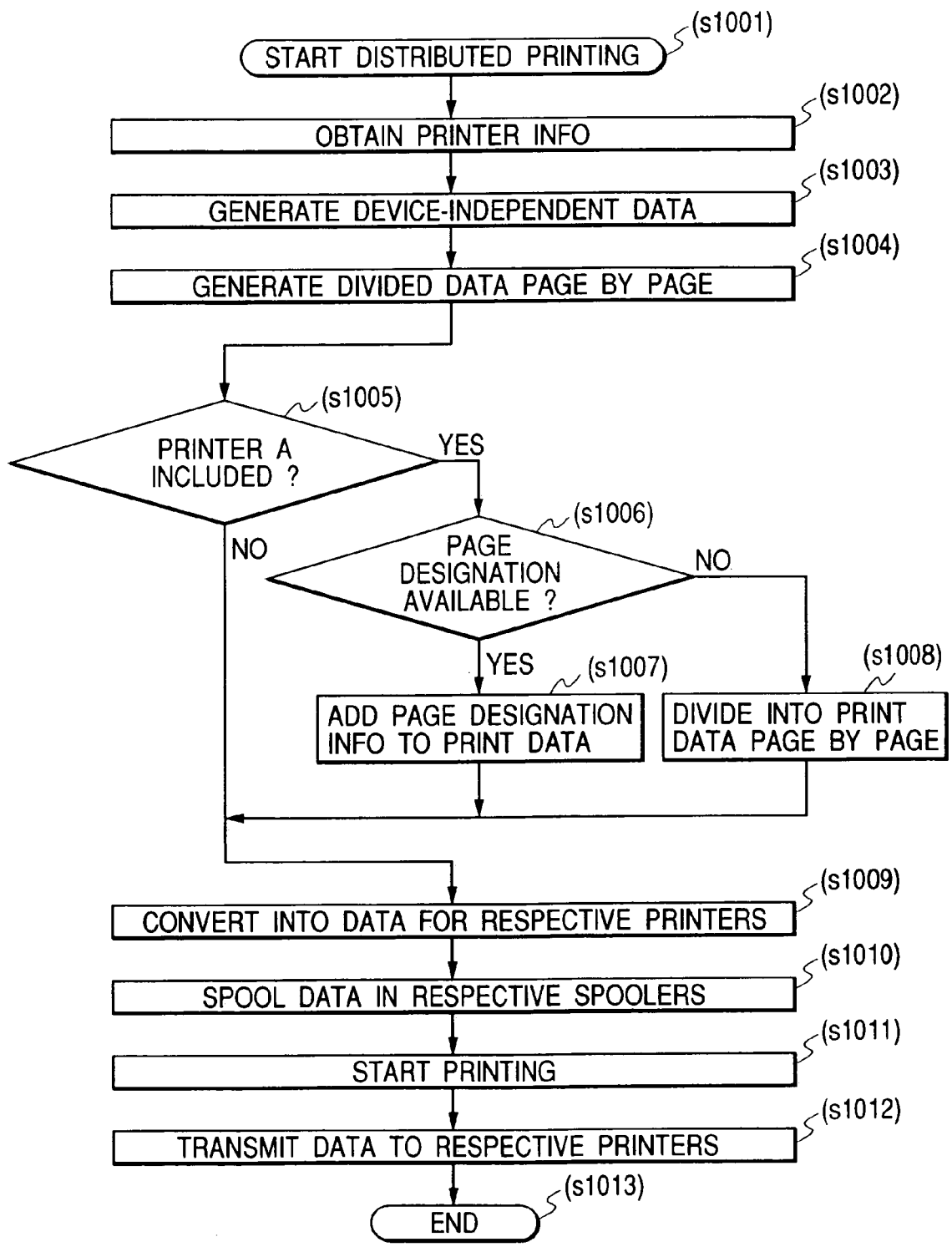
FIG. 14 is a flow chart illustrating an example of a third data process to be executed by the information processing apparatus of the invention.

With reference to FIGS. 13 and 14, distributed printing for device independent print data (e.g., EMF data having a device independent format) will be described.

FIG. 13 is a block diagram of data processing modules of a print system applicable to an information processing apparatus according to a second embodiment of the invention. Like elements to those shown in FIG. 11 are represented by using identical reference symbols. In FIG. 13, spoolers 14-1 to 14-3 spool device independent data as spool files 15-1 to 15-3. This spool file may be a file of GDI function data, or a file of device independent data such as EMF of a binary format. In this case, the data is spooled without the conversion process by a printer driver, and when the spool data is to be printed, the spool data is converted by the printer driver via GDI. A re-spooler 34 divides the device independent data spooled in the spool file 15-1 into data suitable for the printers s103 and s104 and transfers the divided data to GDIs 12-1 and 12-3. GDI 12-1 transfers the GDI function supplied from application software 12 to a printer driver 13-1. Transmitters 31 to 33 read the spool files 15-1 to 15-3 spooled in the spoolers 14-1 to 14-3 and output the print data divided from one job to the printers s102 to s104.

More specifically, if device independent data is spooled, this data is printed after it is converted into PDL data or image data suitable for the device at the print destination. To this end, as shown in FIG. 13, when the application software 11 receives a job from the spooler 14-1, the re-spooler 34 as the data converter acquires the spool file 15-1. The re-spooler 34 divides the spool file so as to be converted by the printer drivers of the printers s103 and s104 to realize the distributed printing. With reference to the flow chart of FIG. 14, the distributed printing process will be described.

FIG. 14 is a flow chart illustrating a third data process to be executed by the information processing apparatus of the invention. The third data process corresponds to the spool process for distributed printing to be executed by the host computer. The third data process includes Steps S1001 to S1013. In this embodiment, a printer object of Windows is used for re-spool (re-print). Other printer objects may also be used if they can divide a job spooled in the device independent data format convertible to other printers, into a plurality of jobs for each printer which are developed into PDL data or image data.

After the spool process shown in the flow chart of FIG. 10, for example, after a job of device independent data such as EMF is spooled, the process starts at Step S1001. At Step S1002, DP printer information is acquired from the re-spooler 34. The DP printer information includes information on division of a job into three divided jobs such as the numbers of pages for respective printers and a page division ratio of, e.g., 1:1:1, information on assignment of pages to the printers in the registration order.

Next, at Step S1003 the data converter of the invention acquires the spool files from the DP printer to generate device independent data. At Step S1004 the data is divided into data for each page. At Step S1005 it is checked whether the DP printers include the printer A. If included, the flow advances to Step S1006.

The print data of PDL data or image data is generated without deleting the original job. Therefore, at Step S1006 it is checked whether the printer A and its printer driver are capable of page designation. If possible, at Step S1007 the page designation information is added to the job data to thereafter follow Step S1009, whereas if impossible, at Step S1008 print data is analyzed and divided into print data corresponding to the number of pages to be printed by the printer A to thereafter follow Step S1009.

If it is judged at Step S1005 that the DP printers do not include the printer A, then at Step S1009 the print data is converted into PDL data or image data by using the printer driver of each DP printer. For example, if the re-spool is used for the printers of Windows, at Step S1010 the print data is re-spooled in the spoolers 14-2 and 14-3 of the printer B and MY printer to wait for the print start at each printer.

Next, when the print process starts at each of the spoolers 14-1 to 14-3 at Step S1011, the transmitters 32 and 33 transfer print data to the printers s103 and s104 to thereafter terminate the distributed printing. In this manner, the distributed printing can be realized.

If it is judged at Step S1005 that all the printers are the printers of Windows, the flow directly advances to Step 1009 to use only the converted print data and realize the distributed printing.

With the above operations, either the distribution printing at printers of the same type providing a good image quality or the distribution printing at printers of different types can be automatically selected.

The first data process of spooling print data is executed before the application issues a print request to the print server s106. The second and third data processes of receiving print data and executing the distributed printing is executed after each printer receives a print permission from the print server s106.

As described previously, an EMF spool file and a RAW spool file are stored in the host computer even after the print data converted in a printer language is transmitted. Each spool file is discarded only after a print completion notice is received from the print server s106. If an error notice is received from the print server s106 in place of the print completion notice, print data is generated from the spool data of the printer with the error notice and output to a substitute printer.

If the printer with the error notice is the same type as that of the substitute printer, the RAW data itself is transmitted, whereas if it is a different type, the substitute printer driver converts the EMG data into data of the printer language and this print data is transmitted. This substitution process between different types of printers is automatically executed and a user is not required to again set up the application and instruct printing the designated pages at the substitute printer.

In the above embodiments, the operation of a personal computer (PC) running on an OS such as Windows has been described. Other OSes and apparatus other than PC may also be used if they can provide different spool processes and printer control for a plurality of output apparatus and can output one job to the output apparatus.

Also in the above embodiments, for the distributed printing with a plurality of printers of different types, it is possible not to increase additional works by a user such as a change in the operation and setting of the distributed printing for each print operation. For the distributed printing with a plurality of printers of the same type, the spool process capable of suppressing an image quality from being lowered can be automatically selected. For the distributed printing with a plurality of printers of different types, a device independent spool process is automatically selected and either the distributed printing with printers of the same type providing a good image quality or the distributed printing with printer of different types can be selectively used, without any change in the works of the operation and setting of application software. Even if a substitute DP printer is used having a different performance of a page designation print function, the distributed printing can be performed efficiently without any practical problem.

Third Embodiment

A third embodiment will be described which is related to an output process for a distributed printing error report based upon the first and second embodiments. The distributed printing method is not limited only to the first and second embodiments.

Figures 15, 16:
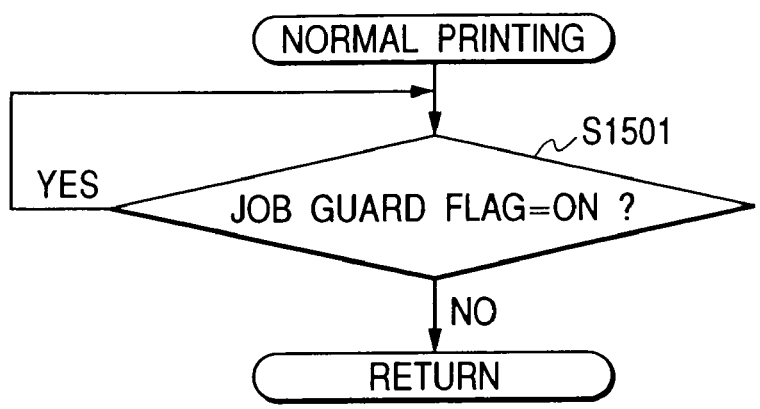
FIG. 15 is a flow chart illustrating an example of a fourth data process to be executed by the information processing apparatus of the invention.
FIG. 16 shows an example of a distributed printing result report output to any one of the printers shown in FIG. 1.

FIG. 16 shows an example of a distributed printing result report or error report output to any one of the printers s102 to s104 shown in FIG. 1. In this example, the distributed printing of a job having ten pages and named as NC001.doc was executed at printers s102 (printer A), s103 (printer B) and s104 (printer C), and the printer B entered a no-paper state so that the pages to be printed by the printer B were passed to the printer C. In FIG. 16, a report 1601 indicates that the top three pages of NC001.doc was output from the printer A and a report 1603 indicates that the printer B entered the no-paper state. A report 1603 indicates that the printer C output seven pages.

Figure 17:
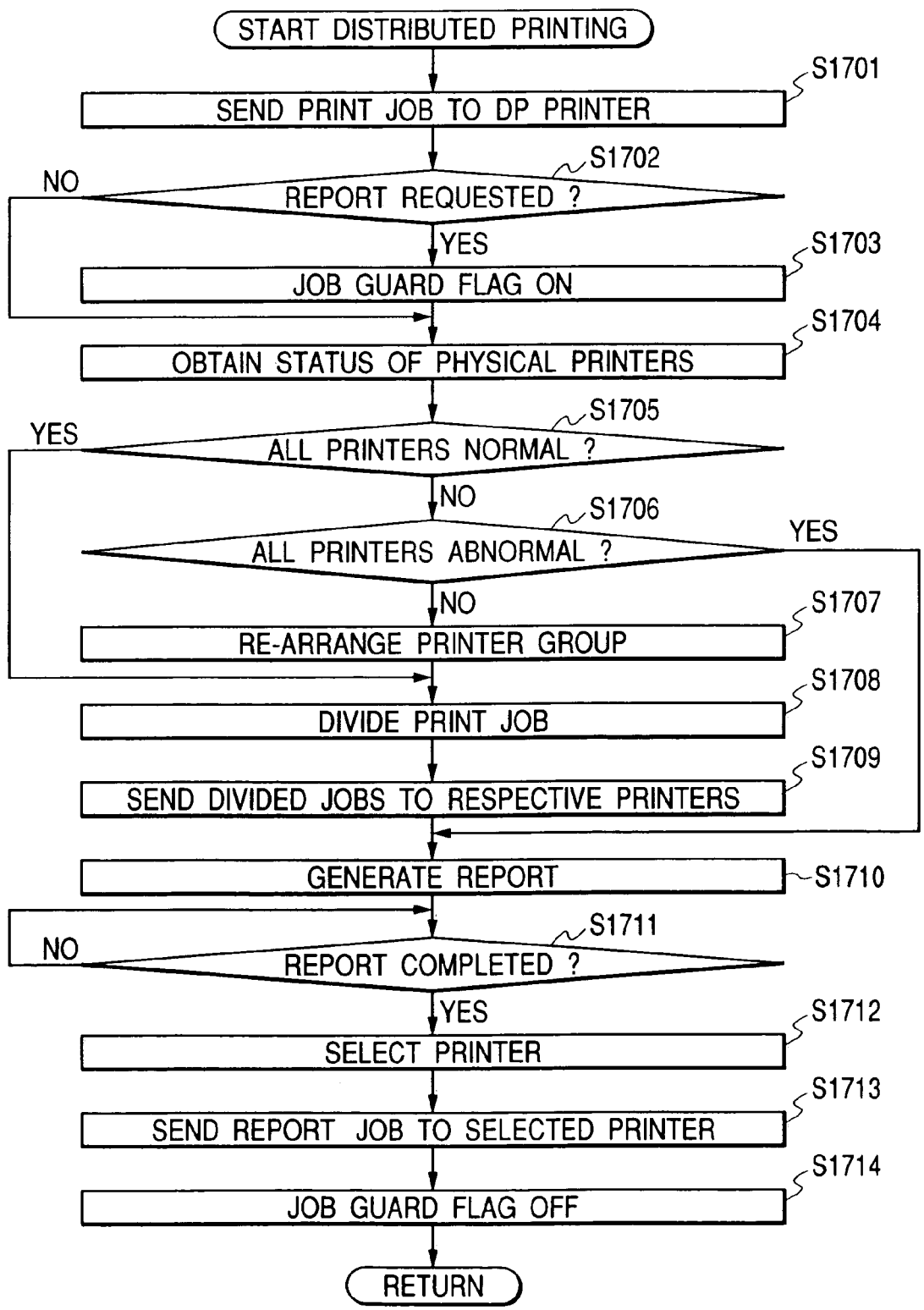
FIG. 17 is a flow chart illustrating an example of a fifth data process to be executed by the information processing apparatus of the invention.

FIG. 17 is a flow chart illustrating an example of a fifth data process to be executed by a host computer s101 and server s106 of the information processing apparatus of the invention. This process corresponds to a distributed printing process and includes Steps S1701 to S1714.

First, when a print controller of the application 11 in the host computer sends a print job to the DP printer 1201 at Step S1701, it is checked at Step S1702 from the setting of the DP algorithm shown in FIG. 9 whether the distributed printing result report is to be requested when the distributed printing job is output. If it is judged that the report is not requested, the flow skips Step S1703 and jumps to Step S1704, whereas if it is judged that the report is to be requested, then at Step S1703 a job guard flag in RAM 202 is set to ON. When this flag is set, the next job print is inhibited. Namely, the print data to be transmitted to distributed printers is added with an off-line command or the like. The host computer supplies the print request information formed at the same time to the server s106.

Next, at Step S1704 the printer monitor 1309 of the server s106 acquires the statuses of physical printers. Namely, the statuses of the printers s102, s103 and s104 registered as the configuration contents of the distributed printers are acquired. A protocol for acquiring the statuses of printers by using SNMP or the like is well known, and so the details thereof are omitted.

Next, it is checked at Step S1705 whether the statuses of all distributed printers are normal or not. If it is judged that all printers are normal, the flow advances to Step S1708.

If it is judged at Step S1705 that all printers are not normal, then the flow advances to Step S1706 whereat it is checked whether all printers are abnormal. If the server s106 judges that all printers are abnormal, this effect is notified to the host computer s101. At Step S1710 the distribution controller 1304 of the host computer s101 forms a distributed printing result report. This report writes the message that the print was performed not at all and the status of each printer.

In order to print the distributed printing result report, GDI 12 is instructed to execute a print process. In this case, a normal print process is executed for the printer designated as the error report output destination.

If it is judged by the server s106 at Step S1706 that all distributed printers are not abnormal, i.e., if there is even one normal printer, this effect is notified to the host computer s101. At Step S1707 the distribution controller 1304 of the host computer re-arranges the printer group to execute the distribution printing by using the re-arranged printer group.

At Step S1708 the distribution controller 1304 divides the print job. The division method may be a method of designating start and end pages of a generally known PJL code without physical division of the file, or a method of physically dividing the job. The distribution controller 1304 passes the intermediate data spooled in the EMF spooler to the printer drivers corresponding to the output destination printers to which the distributed print jobs are supplied. Each printer driver generates the print data.

Next, at Step S1709 the divided jobs generated at Step S1708 are transmitted from the DP printer 1201 to the printers s102, s103 and s104. At Step S1710 the distribution controller 1304 generates a drawing command (GDI function) representative of the distributed printing result report such as shown in FIG. 16 and GDI 12 is instructed to execute a print process. In this embodiment, although the server s106 judges whether the printer is normal or abnormal, the monitor 16 of the host computer s101 may acquire the status of each printer and judges whether the printer is normal or abnormal in the manner similar to the process of the server s106.

Next, at Step S1711 it is checked whether the result report is generated. If generated, at Step S1712 the printer for outputting the distributed printing result report is selected. In this case, the result report output printer registered beforehand by manipulating the registration display shown in FIG. 9 is selected.

Next, at Step S1713 a job for the distributed printing result report is sent to the printer. At Step S1714 the job guard flag set at Step S1703 is set to OFF to thereafter return to the main routine. The process may be designed such that if the job guard flag is ON at Step S1714, the flag is set to OFF.

FIG. 15 is a flow chart illustrating an example of the fourth data process to be executed by the print control system of the invention. The second data process corresponds to the data process during the normal print including various print processes, and includes Step S1501.

First, it is checked at Step S1501 whether the job guard flag is ON. If it is judged that the job guard flag is ON, the print process is suspended, whereas if it is judged that the job guard flag is not ON, the flow remains at Step S1501.

Figure 18A:
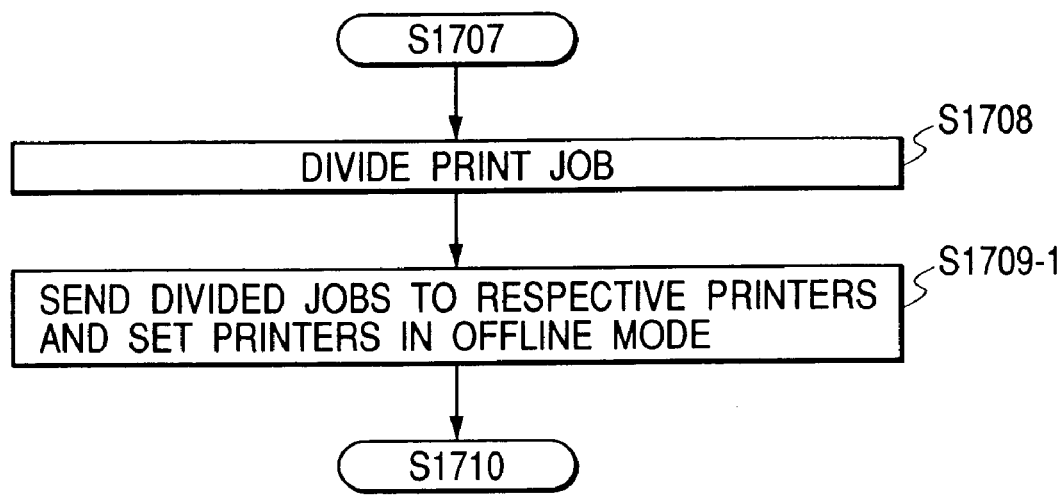
FIGS. 18A and 18B are flow charts illustrating an example of a sixth data process to be executed by the information processing apparatus of the invention.
Figure 18B:
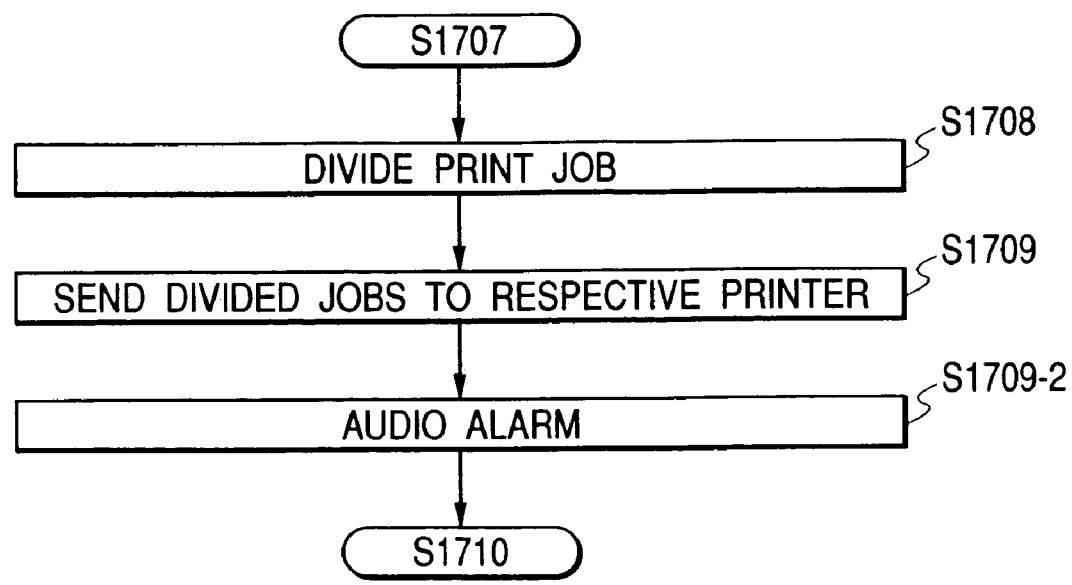

FIGS. 18A and 18B are flow charts illustrating an example of the sixth data process to be executed by the information processing apparatus of the invention. The sixth process corresponds to the detailed processes of the job division and transmission processes during the distributed printing (at Steps S1708 and S1709 shown in FIG. 17), and includes Steps S1708, S1709, S1709-1 and S1709-2.

After the job is divided at Step S1708 shown in FIG. 18A, the divided jobs are set as off-line jobs when the divided jobs are sent to the printers s102, s103 and s104 at Step S1709-1. After the distributed printing jobs are printed, the printers are made off-line to inhibit printing the next job. Using such an off-line function helps a user manually collect copies of the distributed printing.

After the job is divided at Step S1708 shown in FIG. 18B, the divided jobs are sent to the printers s102, s103 and s104 at Step S1709. Thereafter, at Step S1709-2, an audio alarm command is sent to the printers. Using this function helps a user manually collect copies of the distributed printing.

Figure 19A:
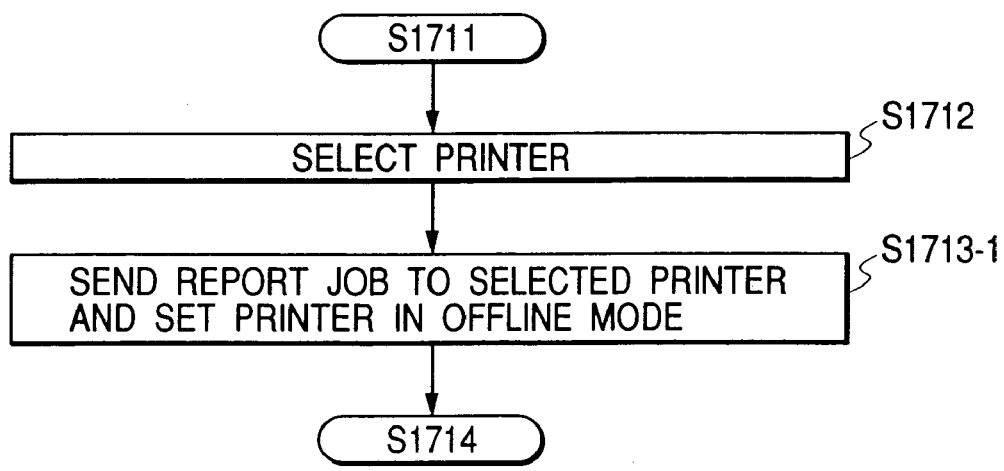
FIGS. 19A and 19B are flow charts illustrating an example of a seventh data process to be executed by the information processing apparatus of the invention.
Figure 19B:
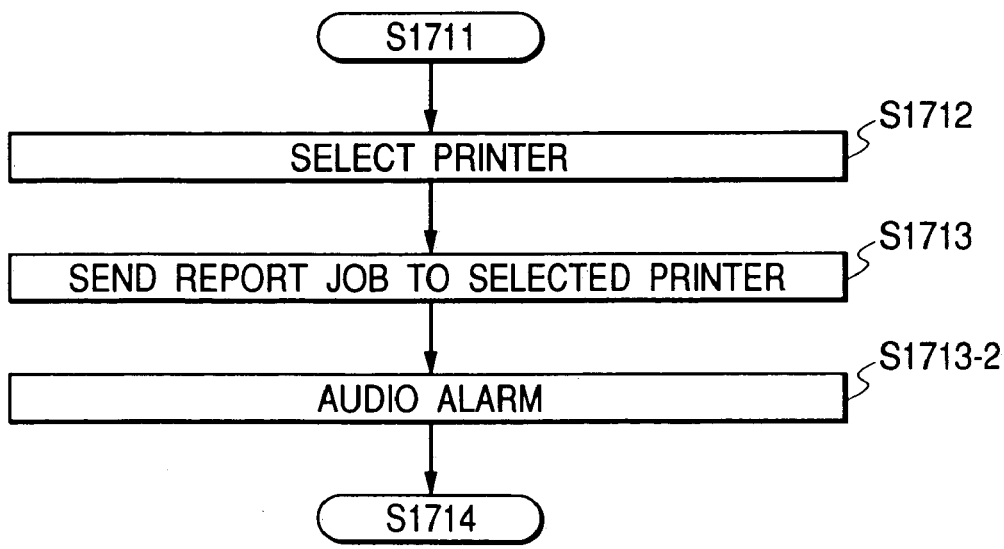

FIGS. 19A and 19B are flow charts illustrating an example of the seventh data process to be executed by the information processing apparatus of the invention. The seventh process corresponds to the detailed processes of the job process for the distributed printing result report (at Steps S1712 and S1713 shown in FIG. 17), and includes Steps S1712, S1713, S1713-1 and S1713-2.

After the printer for outputting the distributed printing result report is selected at Step S1712 shown in FIG. 19A, the report job is set as an off-line job when the report job is sent to the selected printer at Step S1713-1, to thereafter execute another process. After the job of the distributed printing result report is printed, the printer is made off-line to inhibit printing the next job. Using such an off-line function helps a user manually collect copies of the distributed printing.

After the printer for outputting the distributed printing result report is selected at Step S1712 shown in FIG. 19B, the report job is sent to the selected printer at Step S1713. After an audio alarm command is sent to the printer at Step S1713-2, another process is executed. Using this function helps a user manually collect copies of the distributed printing.

FIG. 20 is a memory map showing the contents of each step of a distributed printing program loaded in RAM 202 shown in FIG. 2. In this embodiment, the distributed printing program comprises: a step of executing a distributed printing process; a step of outputting a distributed printing result report; a step of outputting a distributed printing result report only when an error occurs; a step of setting a printer for outputting a distributed printing result report; a step of inhibiting a next job while a distributed printing result report is output; a step of making a printer off-line after the distributed printing process; a step of making the printer off-line after a distributed printing result report is output; and a step of making the printer produce an audio alarm after a distributed printing result report is output.

FIG. 21 is a diagram showing an output state when a distribution error occurs at a DP printer of the invention. If printers 1 to 4 are normal, three pages are printed at each printer and after the last page is printed a distributed printing result report is printed. In this example shown in FIG. 21, after the printer 3 prints the seventh page and it becomes abnormal such as no-paper, report information including a banner is printed at the printer 2 and the next eighth and ninth pages are printed at the printer 2. A user can know the print state from the banner report and can collect copies of the distributed printing.

Figure 22:
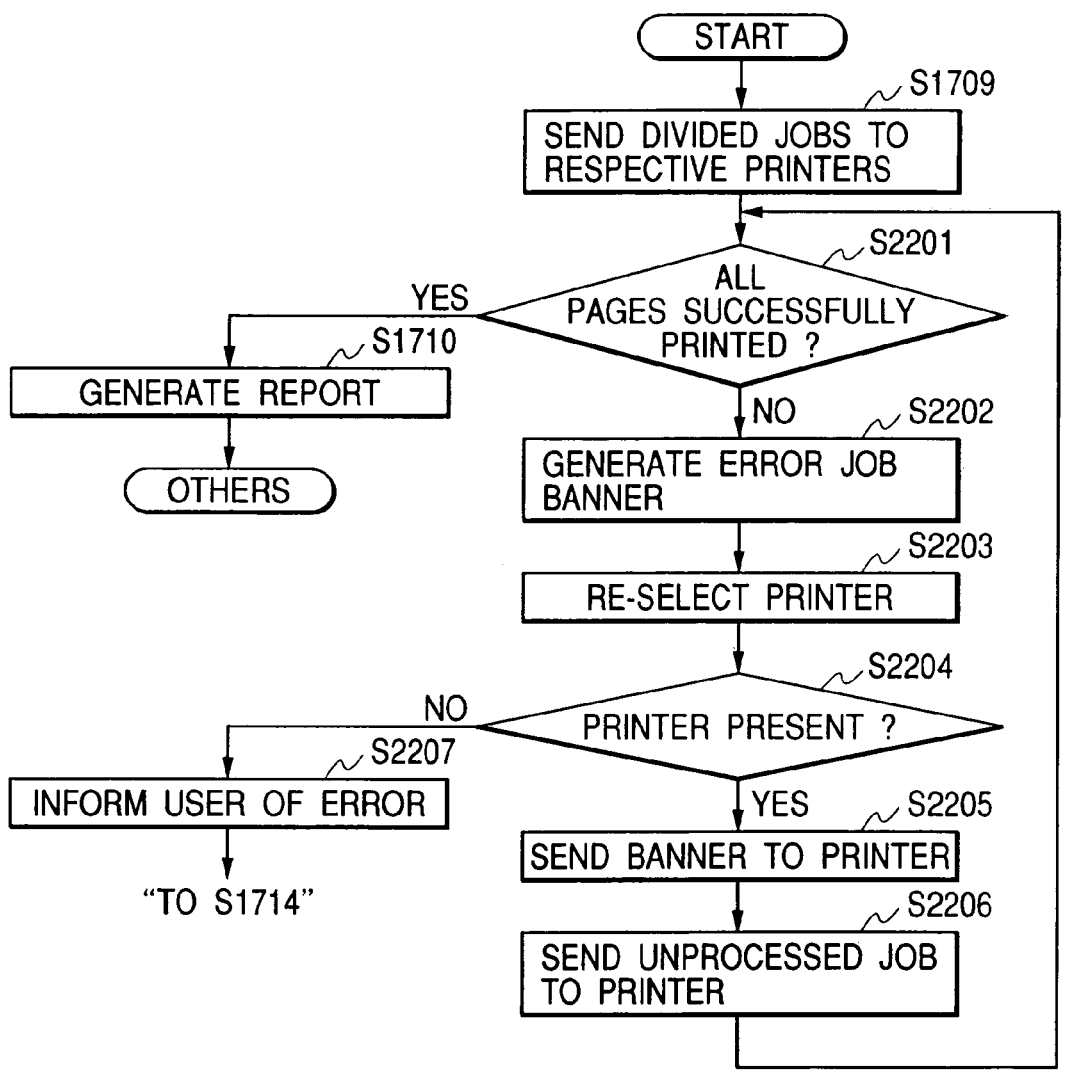
FIG. 22 is a flow chart illustrating an example of an eighth data process to be executed by the information processing apparatus of the invention.

FIG. 22 is a flow chart illustrating an example of an eighth data process to be executed by the information processing apparatus of the invention. The eighth data process corresponds to a banner report output process executable between Steps S1709 and S1710 shown in FIG. 17, and includes Steps S2201 to S2207.

At Step S2201 after Step S1709 shown in FIG. 17, it is checked whether all pages are successfully printed. If successfully printed, the flow advances to Step S1710, whereas if it is judged at Step S2201 that all pages are not successfully printed, the flow advances to Step S2202 whereat a banner is generated for the error job. At Step S2203 a printer for printing still not printed pages and the banner are selected.

Next, at Step S2204 it is checked whether the output printer is selected. If not, the flow advances to Step S2207 whereat a pop-up message or the like is displayed on a pop-up screen to notify a user of an error. Thereafter, the flow advances to Step S1714 shown in FIG. 17.

If it is judged at Step S2204 that the output printer is selected, then at Step S2205 a banner is sent to the printer. Thereafter, after the job still not output is sent at Step S2206, the flow returns to Step S2201 to check again whether all pages are successfully printed. If successfully printed, the flow advances to Step S1710 shown in FIG. 17.

Figure 23:
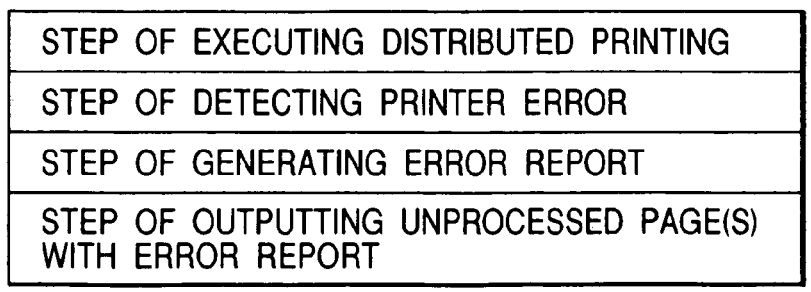
FIG. 23 is a memory map showing the contents of main steps of the distributed printing program loaded in RAM shown in FIG. 2.

FIG. 23 is a memory map showing the contents of main steps of the distributed printing program loaded in RAM 202 shown in FIG. 2. In this embodiment, the main steps comprise: a step of detecting an abnormal state of a printer; a step of forming a report indicating an error result; a step of forming an error result report; and a step of adding the error result report and printing still not printed pages.

In this embodiment, after the distributed printing, a distributed printing result report is output to explicitly notify a user of whether the distributed printing was performed normally or what kind of an error caused the printer to stop. The user can perform the next action immediately. The printer for outputting the distributed printing result is designated so that system management of the distributed printing can be easily made.

After the result report is output, the next job is inhibited to always display the result report at the highest display level. A user can be notified immediately and reliably of the inhibition of the distributed printing. Since the printer can be automatically made off-line or an audio alarm is produced after the completion of the distributed printing, a user can be notified of the completion of the distributed printing. Since the printer which outputs the distributed printing result report can be automatically made off-line or an audio alarm is produced, a user can be notified of the distributed printing result report. When the job output destination is changed for a distributed printing error, a banner page is inserted and remaining jobs are output to thereby notify a user of an occurrence of a distributed printing error.

The structure of a data processing program readable by the print control system of the invention will be described with reference to FIG. 24.

FIG. 24 is a memory map of a storage medium storing the contents of various data processing programs readable by a print system applicable to the print control system of the invention. Although not shown, management information for a program group stored in the storage medium, e.g., version information, programmer names and the like, or OS dependent information on the program read side, e.g., icons for discriminating between programs, may also be stored. Data belonging to each program is also managed in the directory shown in the memory map. A program for installing various programs in a computer, a defreezing program for defreezing the compressed program to be installed, and the like may also be stored.

The embodiment functions illustrated in the flow charts of FIGS. 10, 12, 14, 15, 17, 18A, 18B, 19A, 19B and 22 may be realized by programs externally installed in the host computer. In this case, the invention is applicable to the case wherein programs and data are supplied to output apparatuses by using a storage medium such as a CD-ROM, a flash memory and an FD, or an external storage medium accessible via a network. In this case, program codes themselves read from the storage medium realize novel functions of the invention, and the storage medium storing such program codes constitutes the invention.

The storage medium for storing such program codes may be a floppy disk, a hard disk, an optical disk, a magnetooptical disk, a CD-ROM, a CD-R, a CD-RW, a DVD, a magnetic tape, a nonvolatile memory card, a ROM, an EEPROM or the like.

It is obvious that the scope of the invention contains the case wherein the embodiment functions can be realized by executing read program codes by a computer, or by executing part or the whole of actual processes by an OS (operating system) running on a computer. It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU or the like of the function expansion board or function expansion unit.

The program codes installed in a computer realize the functions and processes of the invention. More specifically, claims of the invention include the computer programs themselves realizing the functions and processes of the invention.

The computer program may be supplied by writing it in FD or CD-ROM and making a computer read and install it, or may be supplied by connecting a browser of a client computer to a home page on the Internet and downloading the program or a compressed file thereof with an automatic install function. The program codes constituting the invention may be divided into a plurality of files. In this case, the functions and processes of the invention can be realized by downloading each file from different home pages. Claims of the invention include a WWW server for downloading a program file to a plurality of users to realize the functions and processes of the invention.

The functions and processes may also be realized by enciphering the program, storing it in a storage medium such as FD, distributing it to users, allowing a user cleared a predetermined condition to download cipher key information from a home page on the Internet, and deciphering the enciphered program by using the cipher key information.

As described so far, according to the invention, in an information processing apparatus for dividing a print job to make a plurality of printers execute a print process, data is spooled in specific file formats in accordance with a combination of a plurality of printers for outputting the divided print jobs, and divided print data is generated from the spooled data and output to the printers in order to print the divided print jobs at the printers. Accordingly, with a simple distributed printing instruction, data of a specific file format can be generated which is suitable even if the types of a combination of printers used for the distributed printing and printer drivers are all the same or different. Then, the requested print job is divided so that each printer can efficiently and normally output the print job through distributed printing.

According to the invention, in accordance with the registered printer candidates, the spooled print job is divided and distributed to designated DP printers. In accordance with the distributed printing result of the print job, a distributed printing result report is formed. After the print job is output through distributed printing, the distributed printing result report is output to one of the printers. The following advantages can therefore be obtained.

(1) Since the distributed printing result report is output after the distributed printing, a system easy to be used by a user can be provided.

(2) The distributed printing result report is output only when the output method is not conformity with a predetermined output method. An error of the distributed printing can therefore be found easily.

(3) A printer to which the distributed printing result report is output is registered beforehand. Therefore, the management of the distributed printing system becomes easy.

(4) if the printer to which the distributed printing result report is output is also used as the output printer for a distributed printing job, the next job is inhibited in order not to make the next job interrupt between the current job and the report job. Copies of the distributed printing can therefore be collected easily.

(5) The printer is automatically made off-line or an audio alarm is produced to notify the user of the distributed printing, after a completion of the distributed printing. A good user interface can therefore be realized.

(6) The printer is automatically made off-line or an audio alarm is produced to notify the user of an output of the distributed printing result report, after an output of the distributed printing result report. A good user interface can therefore be realized.

(7) If an error occurs during the distributed printing, the printer is automatically changed and pages not still output are printed and an error result report is printed. It is therefore possible to notify the user of a distributed printing error without intercepting the printing.

Optimum divided print jobs for a given print job are determined by using a plurality of registered printer resources. The optimum divided print jobs are automatically transferred to the registered printers. The distributed printing result report of the distributed printing is notified to a user. Accordingly, a user can reliably collect copies of the distributed printing from the printers, and the print process environment can be configured as desired which is capable of notifying a user of a print job process error state.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for dividing print data amongst a plurality of printer drivers that generate a plurality of print jobs to make a plurality of printers execute a print process, comprising:
    first spooling means for spooling device-independent-format data converted from data provided by an application, the spooled device-independent-format data being processed by a distributed printer driver that is independent of each of the plurality of printer drivers corresponding to the plurality of printers;
    first assignment means for generating from the device-independent-format data spooled by said first spooling means, a plurality of pieces of divided process data for distribution printing, the divided process data being formed in a device-independent format;
    output means for outputting the plurality of pieces of divided process data generated by said first assignment means to respective corresponding printer drivers which generate device-dependent-format data;
    second spooling means for spooling one of said plurality of device-dependent-format data generated by a predetermined one of said plurality of printer drivers;
    second assignment means for generating from the device-dependent-format data spooled by said second spooling means, a plurality of pieces of divided print data for distribution printing;
    determination means for determining whether the plurality of printers for distribution printing can process a same printer language data;
    control means for performing the spooling process by said first spooling means in a case where said determination means determines that the plurality of printers can not process the same printer language data, and for performing the spooling process by said second spooling means in a case where said determination means determines that the plurality of printers can process the same printer language data; and
    output control means for outputting a plurality of pieces of print data in the device-dependent format to the plurality of printers.

2. An information processing apparatus according to claim 1, further comprising registering means for registering a plurality of output destination printers.

3. An information processing apparatus according to claim 1, wherein said determination means determines a combination of the plurality of printers and determines whether device-dependent data or device-independent data is spooled.

4. An information processing apparatus according to claim 3, wherein said determination means whether all of the plurality of printers are printers using a printer language capable of dividing the print job in a page unit.

5. An information processing apparatus according to claim 3, wherein said determination means whether all of the plurality of printers are printers of a same type.

6. An information processing apparatus according to claim 3, wherein said determination means whether all of the plurality of printers have a same printer driver.

7. An information processing apparatus according to claim 3, wherein the device-dependent data is RAW data and device-independent data is EMF data.

8. An information processing apparatus according to claim 1, further comprising:
    judging means for judging whether a page number of a page to be printed can be designated in the print job to be output from each printer; and
    transfer control means for copying the print job as many as the number of printers for outputting the divided print jobs, adding a page number of a page to be printed to each of the copied print jobs, and transferring the copied print jobs to the printers, if said judging means judges that the page number can be designated, and if said judging means judges that the page number cannot be designated, dividing the print jobs for each page to be printed at the printers for distributed printing and transferring the divided print jobs to the printers.

9. An information processing apparatus according to claim 8, wherein said judging means judges from page designation print performance information of each printer whether the page number of a page to be printed can be designated in the print job to be output from each printer.

10. An information processing apparatus according to claim 2, further comprising:
    re-arranging means for re-arranging a combination of a plurality of printers for outputting the divided print job, among the plurality of printers registered by said registering means, if a printer for outputting the divided print job cannot execute a print process; and
    report forming means for forming a distributed printing result report in accordance with a distributed printing result obtained by the printers rearranged by said re-arranging means,
    wherein after the distributed printing by the rearranged printers, the distributed printing result report formed by said report forming means is output to one of the re-arranged printers.

11. An information processing apparatus according to claim 2, further comprising distributed data generating means for dividing the print job and making a printer driver corresponding to each printer generate print data to print the print data at the printers registered by said registering means, wherein said distributed data generating means controls each printer driver to generate the print data added with an offline command.

12. An information processing apparatus according to claim 11, wherein the printer driver corresponding to each of the printers registered by said registering means generates the print data.

13. An information processing apparatus according to claim 10, wherein if all the printers cannot execute the print process, this effect is output to a printer which outputs the distributed printing result when an error occurs.

14. An information processing apparatus according to claim 11, wherein said registering means registers a printer to which the distributed printing result report is output.

15. An information processing apparatus according to claim 10, wherein the print data is generated by adding an off-line command to the print data for the distributed printing.

16. An information processing apparatus according to claim 10, further comprising:
    judging means for judging whether each of the printers registered by said registering means outputs the print job normally, wherein the distributed printing result report formed by said report forming means is output to a printer to which the report is output, if said judging means judges that the print job for each printer cannot output normally.

17. An information processing apparatus according to claim 10, further comprising:
   detecting means for detecting a print job process error by monitoring a process state of the print job distributed to the printers by said output control means,
   wherein said re-arranging means rearranges a combination of a plurality of printers capable of normally outputting the print job distributed to the printers by said output control means, in accordance with a detection result of the print job process error by said detecting means.

18. An information processing method for dividing print data amongst a plurality of printer drivers that generate a plurality of print jobs to make a plurality of printers execute a print process, comprising:
   a first spooling step of spooling device-independent-format data converted from data provided by an application, the spooled device-independent-format data being processed by a distributed printer driver that is independent of each of the plurality of printer drivers corresponding to the plurality of printers;
   a first assignment step for generating from the device-independent-format data spooled by said first spooling step, a plurality of pieces of divided process data for distribution printing, the divided process data being formed in a device-independent-format;
   an output step for outputting the plurality of pieces of divided process data generated by said first assignment step to respective corresponding printer drivers which generate device-dependent-format data;
   a second spooling step for spooling device-dependent-format data generated by a predetermined one of said plurality of printer drivers;
   a second assignment step for generating from the device-dependent-format data spooled by said second spooling step, a plurality of pieces of divided print data for distribution printing;
   a determination step for determining whether the plurality of printers for distribution printing can process a same printer language data;
   a control step for performing the spooling process by said first spooling step in a case where said determination step determines that the plurality of printers can not process the same printer language data and for performing the spooling process by said second spooling step in a case where said determination step determines that the plurality of printers can process the same printer language data; and
   an output control step of outputting a plurality of pieces of print data in the device-dependent format to the plurality of printers.

19. An information processing method according to claim 18, further comprising a registering step of registering a plurality of output destination printers.

20. An information processing method according to claim 18, wherein said determination step determines a combination of the plurality of printers and determines whether device-dependent data or device-independent data is spooled.

21. An information processing method according to claim 20, wherein said determination step determines whether all of the plurality of printers are printers using a printer language capable of dividing the print job in a page unit.

22. An information processing method according to claim 20, wherein said determination step determines whether all of the plurality of printers are printers of a same type.

23. An information processing method according to claim 20, wherein said determination step determines whether all of the plurality of printers have a same printer driver.

24. An information processing method according to claim 20, wherein the device-dependent data is RAW data and device-independent data is EMF data.

25. An information processing method according to claim 18, further comprising:
   a judging step of judging whether a page number of a page to be printed can be designated in the print job to be output from each printer; and
   a transfer control step of copying the print job as many as the number of printers for outputting the divided print jobs, adding a page number of a page to be printed to each of the copied print jobs, and transferring the copied print jobs to the printers, if said judging step judges that the page number can be designated, and if said judging step judges that the page number cannot be designated, dividing the print jobs for each page to be printed at the printers for distributed printing and transferring the divided print jobs to the printers.

26. An information processing method according to claim 25, wherein said judging step judges from page designation print performance information of each printer whether the page number of a page to be printed can be designated in the print job to be output from each printer.

27. An information processing method according to claim 19, further comprising:
   a re-arranging step of re-arranging a combination of a plurality of printers for outputting the divided print job, among the plurality of printers registered by said registering step, if a printer for outputting the divided print job cannot execute a print process; and
   a report forming step of forming a distributed printing result report in accordance with a distributed printing result obtained by the printers re-arranged by said rearranging step,
   wherein after the distributed printing by the rearranged printers, the distributed printing result report formed by said report forming step is output to one of the rearranged printers.

28. An information processing method according to claim 19, further comprising a distributed data generating step of dividing the print job and making a printer driver corresponding to each printer generate print data to print the print data at the printers registered by said registering step, wherein said distributed data generating step controls each printer driver to generate the print data added with an off-line command.

29. An information processing method according to claim 28, wherein the printer driver corresponding to each of the printers registered by said registering means generates the print data.

30. An information processing method according to claim 27, wherein if all the printers cannot execute the print process, this effect is output to a printer which outputs the distributed printing result when an error occurs.

31. An information processing method according to claim 28, wherein said registering step registers a printer to which the distributed printing result report is output.

32. An information processing method according to claim 27, wherein the print data is generated by adding an off-line command to the print data for the distributed printing.

33. An information processing method according to claim 27, further comprising:
a judging step of judging whether each of the printers registered by said registering step outputs the print job normally,
wherein the distributed printing result report formed by said report forming step is output to a printer to which the report is output, if said judging step judges that the print job for each printer cannot output normally.

34. An information processing method according to claim 27, further comprising:
a detecting step of detecting a print job process error by monitoring a process state of the print job distributed to the printers by said output control step,
wherein said re-arranging step re-arranges a combination of a plurality of printers capable of normally outputting the print job distributed to the printers by said output control step, in accordance with a detection result of the print job process error by said detecting step.

35. A computer-readable memory medium which stores a computer-executable program for a method of dividing print data amongst a plurality of printer drivers that generate a plurality of print jobs to make a plurality of printers execute a print process, said program comprising:
a first spooling step of spooling device-independent-format data converted from data provided by an application, the spooled device-independent-format data being processed by a distributed printer driver that is independent of each of the plurality of printer drivers corresponding to the plurality of printers;
a first assignment step for generating from the device-independent-format data spooled by said first spooling step, a plurality of pieces of divided process data for distribution printing, the divided process data being formed in a device-independent format;
an output step for outputting the plurality of pieces of divided process data generated by said assignment step to respective corresponding printer drivers which generate device-dependent-format data;
a second spooling step for spooling device-dependent-format data generated by a predetermined one of said plurality of printer drivers;
a second assignment step for generating from the device-dependent-format data spooled by said second spooling step a plurality of nieces of divided print data for distribution printing;
a determination step for determining whether the plurality of printers for distribution printing can process a same printer language data;
a control step for performing the spooling process by said first spooling step in a case where said determination step determines that the plurality of printers can not process the same printer language data, and for performing the spooling process by said second spooling step in a case where said determination step determines that the plurality of printers can process the same printer language data; and
an output control step of outputting a plurality of pieces of print data in device-dependent format to the plurality of printers.

36. A computer-readable memory medium according to claim 35, wherein said program further comprises a registering step of registering a plurality of output destination printers.

37. A computer-readable memory medium according to claim 35, wherein said determination step determines a combination of the plurality of printers and determines whether device-dependent data or device-independent data is spooled.

38. A computer-readable memory medium according to claim 35, wherein said determination step determines whether all of the plurality of printers are printers using a printer language capable of dividing the print job in a page unit.

39. A computer-readable memory medium according to claim 37, wherein said determination step determines whether all of the plurality of printers are printers of a same type.

40. A computer-readable memory medium according to claim 37, wherein said determination step determines whether all of the plurality of printers have a same printer driver.

41. A computer-readable memory medium according to claim 37, wherein the device-dependent data is RAW data and device-independent data is EMF data.

42. A computer-readable memory medium according to claim 35, wherein said program further comprises:
a judging step of judging whether a page number of a page to be printed can be designated in the print job to be output from each printer; and
a transfer control step of copying the print job as many as the number of printers for outputting the divided print jobs, adding a page number of a page to be printed to each of the copied print jobs, and transferring the copied print jobs to the printers, if said judging step judges that the page number can be designated, and if said judging step judges that the page number cannot be designated, dividing the print jobs for each page to be printed at the printers for distributed printing and transferring the divided print jobs to the printers.

43. A computer-readable memory medium according to claim 42, wherein said judging step judges from page designation print performance information of each printer whether the page number of a page to be printed can be designated in the print job to be output from each printer.

44. A computer-readable memory medium according to claim 36, wherein said program further comprises:
a re-arranging step of rearranging a combination of a plurality of printers for outputting the divided print job, among the plurality of printers registered by said registering step, if a printer for outputting the divided print job cannot execute a print process; and
a report forming step of forming a distributed printing result report in accordance with a distributed printing result obtained by the printers re-arranged by said re-arranging step,
wherein after the distributed printing by the re-arranged printers, the distributed printing result report formed by said report forming step is output to one of the re-arranged printers.

45. A computer-readable memory medium according to claim 36, wherein said program further comprises a distributed data generating step of dividing the print job and making a printer driver corresponding to each printer generate print data to print the print data at the printers registered by said registering step, wherein said distributed data generating step controls each printer driver to generate the print data added with an off-line command.

46. A computer-readable memory medium according to claim 45, wherein the printer driver corresponding to each of the printers registered by said registering step generates the print data.

47. A computer-readable memory medium according to claim 44, wherein if all the printers cannot execute the print process, this effect is output to a printer which outputs the distributed printing result when an error occurs.

48. A computer-readable memory medium according to claim 45, wherein said registering step registers a printer to which the distributed printing result report is output.

49. A computer-readable memory medium according to claim 44, wherein the print data is generated by adding an off-line command to the print data for the distributed printing.

50. A computer-readable memory medium according to claim 44, wherein said program further comprises:
  a judging step of judging whether each of the printers registered by said registering step outputs the print job normally,
  wherein the distributed printing result report formed by said report forming step is output to a printer to which the report is output, if said judging step judges that the print job for each printer cannot output normally.

51. A computer-readable memory medium according to claim 44, wherein said program further comprises:
  a detecting step of detecting a print job process error by monitoring a process state of the print job distributed to the printers by said output control step,
  wherein said rearranging step rearranges a combination of a plurality of printers capable of normally outputting the print job distributed to the printers by said output control step, in accordance with a detection result of the print job process error by said detecting step.

52. A computer-executable program stored on a computer-readable storage medium, said program for implementing a method of dividing print data amongst a plurality of printer drivers that generate a plurality of print jobs to make a plurality of printers execute a print process, said program comprising:
  a first spooling step of spooling device-independent-format data converted from data provided by an application, the spooled device-independent-format data being processed by a distributed printer driver that is independent of each of the plurality of printer drivers corresponding to the plurality of printers;
  a first assignment step for generating from the device-independent-format data spooled by said first spooling step, a plurality of pieces of divided process data for distribution printing, the divided process data being formed in a device-independent format;
  an output step for outputting the plurality of pieces of divided process data generated by said assignment step to respective corresponding printer drivers which generate device-dependent-form a data;
  a second spooling step for spooling device-dependent-format data generated by a predetermined one of said plurality of printer drivers;
  a second assignment step for generating from the device-dependent-format data spooled by said second spooling step, a plurality of pieces of divided print data for distribution printing;
  a determination step for determining whether the plurality of printers for distribution printing can process a same printer language data;
  a control step for performing the spooling process by said first spooling step in a case where said determination step determines that the plurality of printers can not process the same printer language data, and for performing the spooling process by said second spooling step in a case where said determination step determines that the plurality of printers can process the same printer language data; and
  an output control step of outputting a plurality of pieces of print data in the device-dependent format to the plurality of printers.

53. A computer program according to claim 52, wherein said program further comprises a registering step of for registering a plurality of output destination printers.

54. A computer program according to claim 52, wherein said determination step determines a combination of the plurality of printers and determines whether device-dependent data or device-independent data is spooled.

55. A computer program according to claim 54, wherein said determination step determines whether all of the plurality of printers are printers using a printer language capable of dividing the print job in a page unit.

56. A computer program according to claim 54, wherein said determination step determines whether all of the plurality of printers are printers of a same type.

57. A computer program according to claim 54, wherein said determination step determines whether all of the plurality of printers have a same printer driver.

58. A computer program according to claim 54, wherein the device-dependent data is RAW data and device-independent data is EMF data.

59. A computer program according to claim 52, wherein said program further comprises:
  a judging step of judging whether a page number of a page to be printed can be designated in the print job to be output from each printer; and
  a transfer control step of copying the print job as many as the number of printers for outputting the divided print jobs, adding a page number of a page to be printed to each of the copied print jobs, and transferring the copied print jobs to the printers, if said judging step judges that the page number can be designated, and if said judging step judges that the page number cannot be designated, dividing the print jobs for each page to be printed at the printers for distributed printing and transferring the divided print jobs to the printers.

60. A computer program according to claim 59, wherein said judging step judges from page designation print performance information of each printer whether the page number of a page to be printed can be designated in the print job to be output from each printer.

61. A computer program according to claim 53, wherein said program further comprises:
  a re-arranging step of re-arranging a combination of a plurality of printers for outputting the divided print job, among the plurality of printers registered by said registering step, if a printer for outputting the divided print job cannot execute a print process; and
  a report forming step of forming a distributed printing result report in accordance with a distributed printing result obtained by the printers re-arranged by said re-arranging step,
  wherein after the distributed printing by the rearranged printers, the distributed printing result report formed by said report forming step is output to one of the rearranged printers.

62. A computer program according to claim 53, wherein said program further comprises a distributed data generating step of dividing the print job and making a printer driver corresponding to each printer generate print data to print the print data at the printers registered by said registering step, wherein said distributed data generating step controls each printer driver to generate the print data added with an off-line command.

63. A computer program according to claim 62, wherein the printer driver corresponding to each of the printers registered by said registering step generates the print data.

64. A computer program according to claim 61, wherein if all the printers cannot execute the print process, this effect is output to a printer which outputs the distributed printing result when an error occurs.

65. A computer program according to claim 62, wherein said registering step registers a printer to which the distributed printing result report is output.

66. A computer program according to claim 61, wherein the print data is generated by adding an offline command to the print data for the distributed printing.

67. A computer program according to claim 61, wherein said program further comprises:

a judging step of judging whether each of the printers registered by said registering step outputs the print job normally, wherein the distributed printing result report formed by said report forming step is output to a printer to which the report is output, if said judging step judges that the print job for each printer cannot output normally.

68. A computer program according to claim 61, wherein said program further comprises:

a detecting step of detecting a print job process error by monitoring a process state of the print job distributed to the printers by said output control step, wherein said re-arranging step re-arranges a combination of a plurality of printers capable of normally outputting the print job distributed to the printers by said output control step, in accordance with a detection result of the print job process error by said detecting step.

* * * * *

UNITED STATES PATENT AND TRADEMARK OFFICE
CERTIFICATE OF CORRECTION

PATENT NO. : 7,061,635 B1
APPLICATION NO. : 09/678017
DATED : June 13, 2006
INVENTOR(S) : Koichiro Wanda et al.

It is certified that error appears in the above-identified patent and that said Letters Patent is hereby corrected as shown below:

COLUMN 5:
Line 2, "metal" should read -- meta --.

COLUMN 7:
Line 64, "than" should read -- then --.

COLUMN 8:
Line 26, "Step 610" should read -- Step S610 --.

COLUMN 10:
Line 54, "Step 1009" should read -- Step S1009 --.

COLUMN 16:
Line 34, "not" should read -- not in --; and
Line 40, "if" should read -- If --.

COLUMN 17:
Lines 59, 63 and 66, "means" should read -- means determines --.

COLUMN 19:
Line 49, "data" should read -- data, --.

COLUMN 20:
Line 59, "means" should read -- step --.

COLUMN 21:
Line 48, "nieces" should read -- pieces --; and
Line 62, "in" should read -- in the --.

COLUMN 22:
Line 7, "claim 35," should read -- claim 37, --.

COLUMN 23:
Line 52, "device-dependent-form a data;" should read -- device-dependent-format data; --.

UNITED STATES PATENT AND TRADEMARK OFFICE
CERTIFICATE OF CORRECTION

PATENT NO.       : 7,061,635 B1
APPLICATION NO.  : 09/678017
DATED            : June 13, 2006
INVENTOR(S)      : Koichiro Wanda et al.

It is certified that error appears in the above-identified patent and that said Letters Patent is hereby corrected as shown below:

<u>COLUMN 24</u>:
Line 8, "for" should be deleted.

Signed and Sealed this

Twenty-sixth Day of June, 2007

JON W. DUDAS
*Director of the United States Patent and Trademark Office*